(12) United States Patent
Canel

(10) Patent No.: US 11,328,696 B2
(45) Date of Patent: May 10, 2022

(54) STRINGED INSTRUMENT

(71) Applicant: Matthew Canel, Cleveland, OH (US)

(72) Inventor: Matthew Canel, Cleveland, OH (US)

(*) Notice: Subject to any disclaimer, the term of this patent is extended or adjusted under 35 U.S.C. 154(b) by 0 days.

(21) Appl. No.: 17/149,207

(22) Filed: Jan. 14, 2021

(65) Prior Publication Data

US 2021/0225336 A1    Jul. 22, 2021

Related U.S. Application Data

(60) Provisional application No. 62/962,577, filed on Jan. 17, 2020.

(51) Int. Cl.
| | |
|---|---|
| *G10D 3/06* | (2020.01) |
| *G10D 3/13* | (2020.01) |
| *G10D 1/05* | (2020.01) |
| *B33Y 80/00* | (2015.01) |

(52) U.S. Cl.
CPC ............... *G10D 3/06* (2013.01); *G10D 1/05* (2020.02); *G10D 3/13* (2020.02); *B33Y 80/00* (2014.12)

(58) Field of Classification Search
CPC .............. G10D 3/06; G10D 3/13; G10D 1/05
See application file for complete search history.

(56) References Cited

U.S. PATENT DOCUMENTS

| | | | | |
|---|---|---|---|---|
| 517,913 A | * | 4/1894 | Barrows ................. | G10D 3/06 84/293 |
| 602,695 A | * | 4/1898 | Casolin ................... | G10D 1/08 84/293 |
| 624,309 A | * | 5/1899 | De Lano ................. | G10D 1/10 84/300 |
| 945,102 A | * | 1/1910 | Lindsey .................. | G10D 1/02 84/303 |
| 1,364,217 A | * | 1/1921 | Surratt .................... | G10D 3/22 84/267 |
| 1,803,661 A | * | 5/1931 | Swearingen ............ | G10D 1/02 84/302 |
| 1,884,434 A | * | 10/1932 | Wehmann ............... | G10D 3/13 84/302 |

(Continued)

FOREIGN PATENT DOCUMENTS

CN    201051375 Y    4/2008

OTHER PUBLICATIONS

How to 3D Print A Violin Dec. 18, 2018 viewed Sep. 9, 2021 at https://www.youtube.com/watch?v=nt74P1ZW1zU. The important parts of the disclosure are excerpted into the office action. 2019.*

(Continued)

*Primary Examiner* — Robert W Horn
(74) *Attorney, Agent, or Firm* — Greer, Burns & Crain, Ltd.

(57) ABSTRACT

A string instrument has a neck attached to a body and extending outwardly therefrom. The body has a top plate joined to a bottom plate by a continuous rib forming an interior volume therebetween. A tailpiece is joined to the body. The tailpiece has tubular string bores. Each string bore has an entrance for receiving a string therein and an exit from which the string emerges and extends to the neck. At least one the exits has a cross-sectional shape in which a length of a major axis of the cross-sectional shape is greater than a length of a minor axis of the cross-sectional shape.

15 Claims, 26 Drawing Sheets

(56) References Cited

U.S. PATENT DOCUMENTS

| | | | | |
|---|---|---|---|---|
| 1,888,140 | A * | 11/1932 | Novotny | G10D 1/02 84/313 |
| 2,124,439 | A * | 7/1938 | Sunshine | G10D 1/00 84/299 |
| 2,449,124 | A * | 9/1948 | Kimmons | G10D 1/05 84/267 |
| 2,585,661 | A * | 2/1952 | Kluson | G10D 1/08 84/299 |
| 2,816,469 | A * | 12/1957 | Gossom | G10D 1/05 84/293 |
| 3,417,646 | A * | 12/1968 | Hall | G10D 3/06 84/293 |
| 3,478,631 | A * | 11/1969 | Fisher | G10D 1/00 84/293 |
| 4,145,948 | A * | 3/1979 | Turner | G10D 3/22 84/293 |
| 4,171,660 | A * | 10/1979 | Kingsbury | G10D 1/08 84/297 R |
| 4,282,792 | A | 8/1981 | Voorthuyzen | |
| 4,313,362 | A * | 2/1982 | Lieber | G10D 3/22 84/267 |
| 5,025,695 | A * | 6/1991 | Viel | G10D 1/08 84/293 |
| 5,072,643 | A * | 12/1991 | Murata | G10D 1/00 84/293 |
| 5,549,027 | A * | 8/1996 | Steinberger | G10D 3/12 84/297 R |
| 5,661,252 | A * | 8/1997 | Krawczak | G10D 3/06 84/291 |
| 6,225,544 | B1 * | 5/2001 | Sciortino | A63J 17/00 84/464 A |
| 7,157,634 | B1 * | 1/2007 | Babicz | G10D 1/08 84/293 |
| 7,531,729 | B1 * | 5/2009 | Davis | G10D 3/095 84/293 |
| 7,592,529 | B2 * | 9/2009 | Tamura | G10H 3/185 84/309 |
| 7,795,513 | B2 * | 9/2010 | Luttwak | G10D 3/02 84/267 |
| 7,842,868 | B2 * | 11/2010 | Else | G10D 3/06 84/293 |
| 7,847,169 | B2 | 12/2010 | Umeda | |
| 8,389,837 | B1 * | 3/2013 | Leguia | G10D 1/08 84/314 R |
| 8,637,753 | B2 * | 1/2014 | Zelinsky | G10D 3/06 84/293 |
| 8,759,649 | B2 * | 6/2014 | Potyrala | G10D 3/10 84/293 |
| 8,859,867 | B2 * | 10/2014 | Tarohra | G10D 3/06 84/298 |
| 11,094,297 | B2 * | 8/2021 | Winzer | G10H 3/185 |
| 2021/0020147 | A1 * | 1/2021 | Powers | G10D 3/13 |
| 2021/0205888 | A1 * | 7/2021 | Hou | B33Y 10/00 |
| 2021/0225335 | A1 * | 7/2021 | Canel | G10D 3/06 |
| 2021/0225336 | A1 * | 7/2021 | Canel | G10D 1/05 |
| 2021/0304719 | A1 * | 9/2021 | Perry | G10H 3/143 |
| 2022/0005375 | A1 * | 1/2022 | Carter | G09B 15/06 |

OTHER PUBLICATIONS

U.S. Office Action from corresponding U.S. Patent Application No.

* cited by examiner

STRINGED INSTRUMENT

CROSS-REFERENCE TO RELATED APPLICATIONS

This application claims the benefit of U.S. Provisional Patent Application No. 62/962,577, filed Jan. 17, 2020, which is incorporated by reference herein in its entirety.

FEDERALLY SPONSORED RESEARCH OR DEVELOPMENT

N/A

TECHNICAL FIELD

The invention relates to a stringed instrument; more particularly, the invention relates to violin instrument.

BACKGROUND OF THE INVENTION

A violin is a wooden string instrument. Most violins have a hollow wooden body. A violin generally consists of a spruce top (the soundboard, also known as the top plate, table, or belly), maple ribs and back, two end blocks, a neck, a bridge, a soundpost, four strings, and various fittings, optionally including a chinrest, which may attach directly over, or to the left of, the tailpiece. A distinctive feature of a violin body is its hourglass-like shape and the arching of its top and back. The hourglass shape comprises two upper bouts, two lower bouts, and two concave C-bouts at the waist, providing clearance for the bow. The sound of a violin depends on its shape, the material it is made from, the graduation (the thickness profile) of both the top and back, and any coatings on its outside surface.

The violin includes four strings. The strings are usually tuned in perfect fifths with notes G3, D4, A4, E5. A violin is played by drawing a bow across the strings. It can also be played by plucking the strings with the fingers and by striking the strings with the wooden side of the bow.

Historically, finely handmade violins were made by hand. Violins produced by the Stradivari, Guarneri, Guadagnini and Amati families were prized collectors' items.

More recently, manufacturers mass-produced violins at lower costs. Beginners and novices commonly adopted these mass-produced violins. However, the quality and sound of these mass-produced violins has been subject to criticism.

The present invention is provided to solve the problems discussed above and other problems, and to provide advantages and aspects not provided by prior stringed instruments of this type. A full discussion of the features and advantages of the present invention is deferred to the following detailed description, which proceeds with reference to the accompanying drawings.

SUMMARY

One aspect of the present invention is directed to a string instrument. The string instrument comprises a body comprising a top plate joined to a bottom plate forming an interior volume therebetween. A neck is attached to the body and extends outwardly therefrom. A tailpiece is joined to the body. The tailpiece comprises a plurality of tubular string bores. Each string bore has an entrance for receiving a string therein and an exit from which the string emerges and extends to the neck. At least one of the exits has a cross-sectional shape in which a length of a major axis of the cross-sectional shape is greater than a length of a minor axis of the cross-sectional shape.

This aspect of the invention may include one or more of the following features, alone or in any reasonable combination. The string instrument may comprise at least three string bores wherein each strong bore exits is separated from an adjacent string bore exit by a space wherein a length each space is equal to a length of an adjacent space. Each string bore may have a throat defined by a decreasing cross-sectional area of the string bore, each throat having an entry end and an exit end wherein each entry end is positioned at a height equal to a height of an entry end of an adjacent string bore. The string instrument may further comprise a bridge extending upwardly from the top plate between the neck and the tailpiece and over which each string in a plurality of strings is tensioned wherein the neck has a top nut on an end opposite an opposing end attached to the body, wherein a plurality of strings engage the top nut and extend down a length of the neck towards the tailpiece, the top nut having a plurality of grooves, each groove configured to receive a string in the plurality of strings and position the string at a height above a fingerboard surface of the neck, wherein the height of the string satisfies an equation where:

$$H_{TN} = \frac{D_{string}}{2} + \Delta H_{TN \to B} + K$$

where $H_{TN}$ is a height of the top nut above the fingerboard, $D_{string}$ is a string diameter, $\Delta H_{TN \to B}$ is a minimum height of the top nut above the bridge, and K is a correction factor between −0.5 mm to 0.5 mm. The neck may have a central bore extending from a free end towards the body, the central bore configured to achieve a desired resonance, wherein the central bore has a circular cross-sectional shape having a diameter no less than 3 mm and no greater than 10 mm. At least one of the string bore exits may have an oval cross-sectional shape. The string instrument may further comprise a tuner box joined to the neck opposite the body, the tuner box having a tuner bed having a plurality of apertures formed therein through which a corresponding plurality of tuners extend, the tuner bed having a thickness through which the apertures extend, the thickness within a range of 12 mm to 20 mm.

Another aspect of the invention is directed to a string instrument. The string instrument comprises a body, a neck, and a tailpiece. The body comprises a top plate joined to a bottom plate forming an interior volume therebetween. The neck is attached to the body and extends outwardly therefrom. The tailpiece is joined to the body. The tailpiece comprises at least three tubular string bores, each string bore having an entrance for receiving a string therein and an exit from which the string emerges and extends to the neck, wherein each strong bore exits is separated from an adjacent string bore exit by a space wherein a length each space is equal to a length of an adjacent space.

Another aspect of the invention is directed to a string instrument. The string instrument comprises a body, a neck, and a tailpiece. The body comprises a top plate joined to a bottom plate forming an interior volume therebetween. The neck is attached to the body and extends outwardly therefrom. The tailpiece is joined to the body. The tailpiece comprises a plurality of tubular string bores, each string bore having an entrance for receiving a string therein and an exit from which the string emerges and extends to the neck, wherein each string bore has a throat defined by a decreasing cross-sectional area of the string bore, each throat having an entry end and an exit end wherein each entry end is positioned at a height equal to a height of an entry end of an adjacent string bore.

Another aspect of the invention is directed to a string instrument. The string instrument comprises a body, a neck, a tailpiece, and a bridge. The body comprises a top plate joined to a bottom plate forming an interior volume therebetween. The neck is attached to the body and extends outwardly therefrom. The tailpiece joined to the body. The bridge extends upwardly from the top plate between the neck and the tailpiece and over which each string in a plurality of strings is tensioned wherein the neck has a top nut on an end opposite an opposing end attached to the body, wherein a plurality of strings engage the top nut and extend down a length of the neck towards the tailpiece, the top nut having a plurality of grooves, each groove configured to receive a string in the plurality of strings and position the string at a height above a fingerboard surface of the neck, wherein the height of the string satisfies an equation where:

$$H_{TN} = \frac{D_{string}}{2} + \Delta H_{TN \to B} + K$$

where $H_{TN}$ is a height of the top nut above the fingerboard, $D_{string}$ is a string diameter, $\Delta H_{HTN \to B}$ is a minimum height of the top nut above the bridge, and K is a correction factor between −0.5 mm to 0.5 mm.

Another aspect of the invention is directed to a string instrument. The string instrument comprises a body, a neck, and a tailpiece. The body comprises a top plate joined to a bottom plate forming an interior volume therebetween. The neck is attached to the body and extends outwardly therefrom. The tailpiece is joined to the body. The neck has a central bore extending from a free end towards the body, the central bore configured to achieve a desired resonance, wherein the central bore has a circular cross-sectional shape having a diameter no less than 3 mm and no greater than 10 mm.

Another aspect of the invention is directed to a string instrument. The string instrument comprises a body, a neck, a tailpiece, and a tuner box. The body comprises a top plate joined to a bottom plate forming an interior volume therebetween. The neck is attached to the body and extends outwardly therefrom. The tailpiece is joined to the body. The tuner box is joined to the neck opposite the body, the tuner box having a tuner bed having a plurality of apertures formed therein through which a corresponding plurality of tuners extend, the tuner bed having a thickness through which the apertures extend, the thickness within a range of 12 mm to 20 mm.

The various aspects of the present invention, may include one or more of the following features, alone or in any reasonable combination. The tailpiece may comprise a shell wall defining a volume between the shell wall and the top plate, the shell wall having opposing sidewalls and a front face, wherein at least two string bore entrances are located on a first sidewall and at least two string bores entrances are located on an opposing second side wall, and wherein at least four string bore exits are located on the front face. The at least four string bore exits may be arranged in a straight line across the front face of the tailpiece. The body and the tailpiece may be of a single body construction, wherein the body and the tailpiece are integrally formed from a single piece of material. The body may comprise a soundpost within the interior volume, the soundpost joining the top plate and the bottom plate and integrally formed therewith. The body and the neck may be produced via additive manufacturing. The string instrument may be a violin. The neck and the body may be produced from a polymeric material. The neck and the body may be produced from a polylactic acid.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
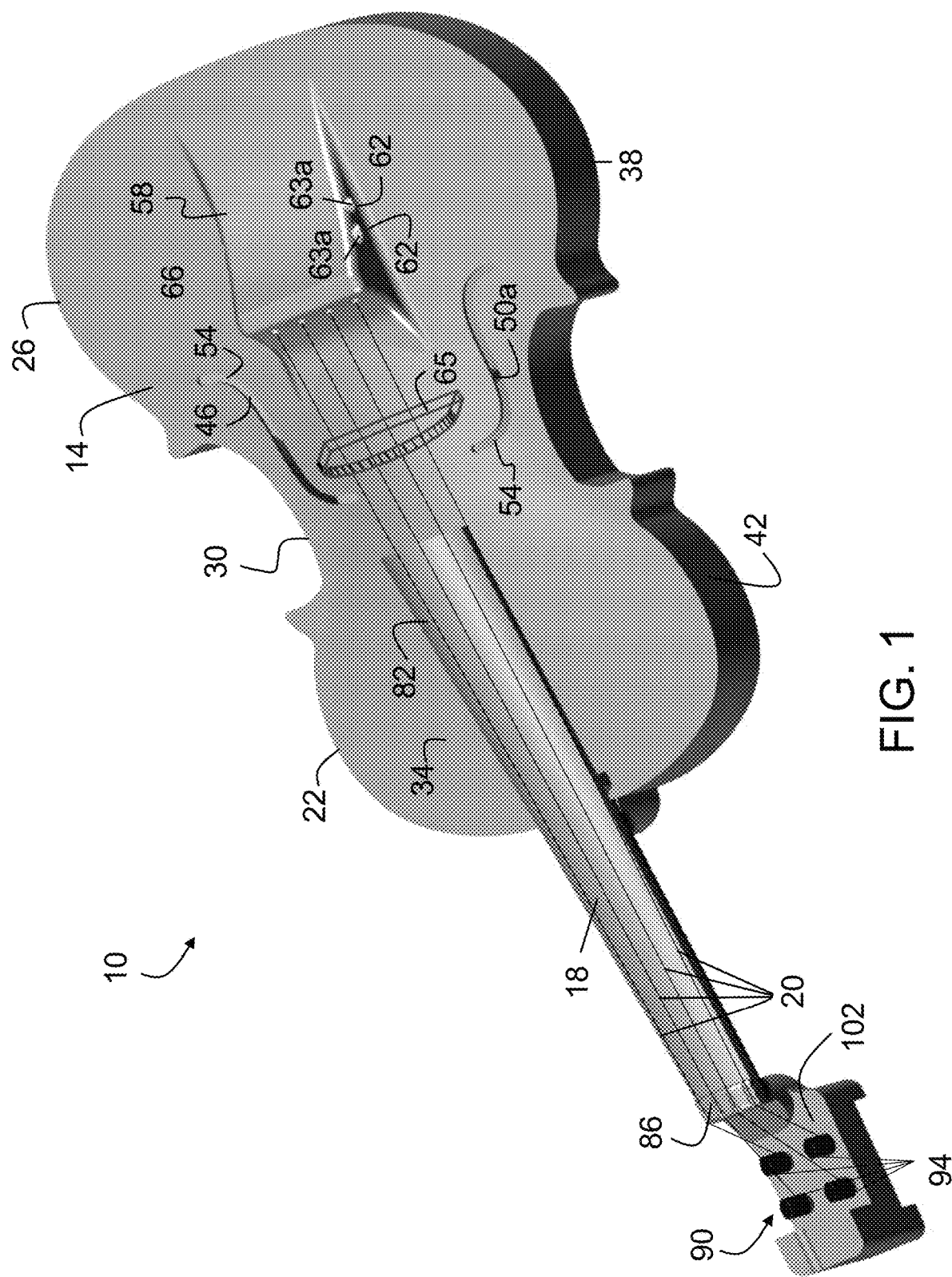
FIG. 1 is an elevational view of a stringed instrument of the present invention.
Figure 2:
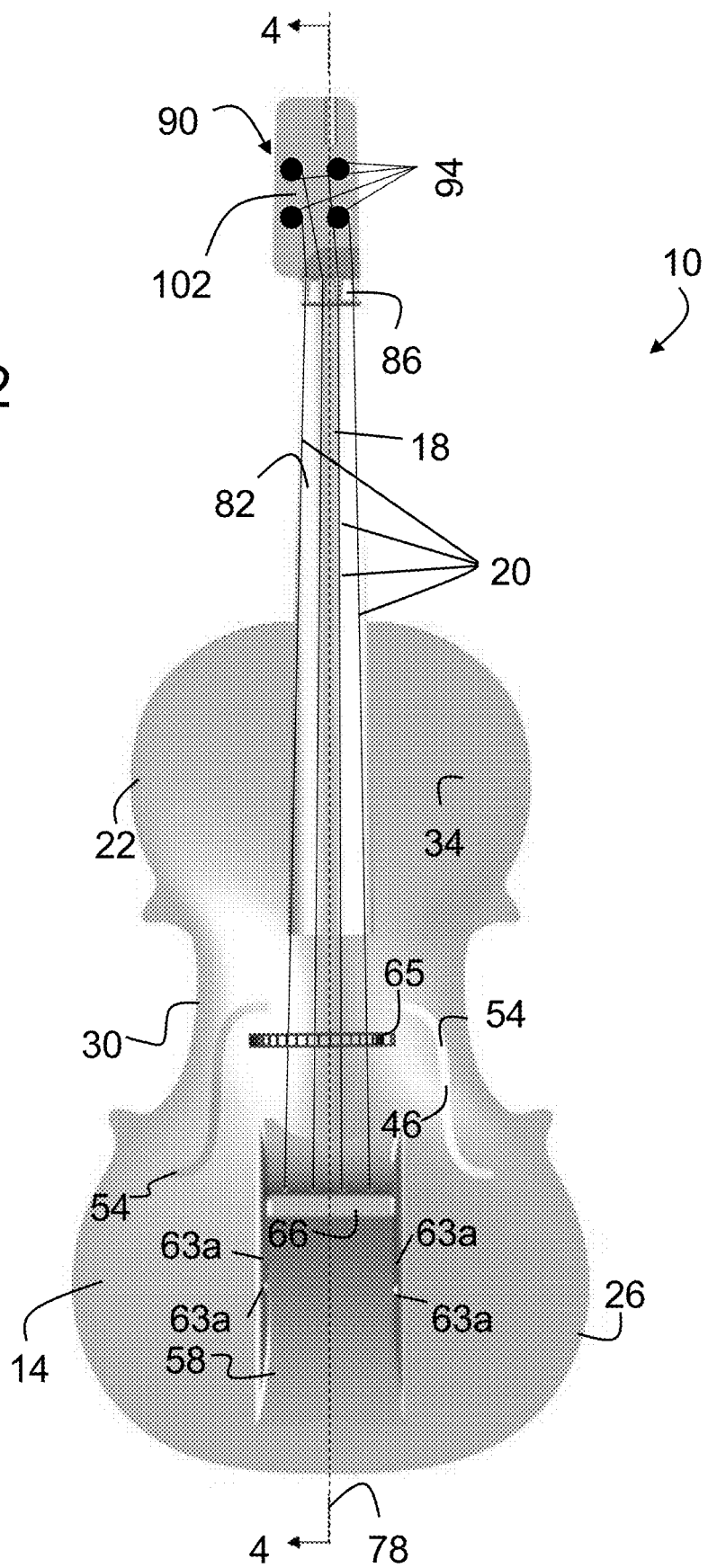
FIG. 2 is a top view of the stringed instrument of FIG. 1.
Figure 3:
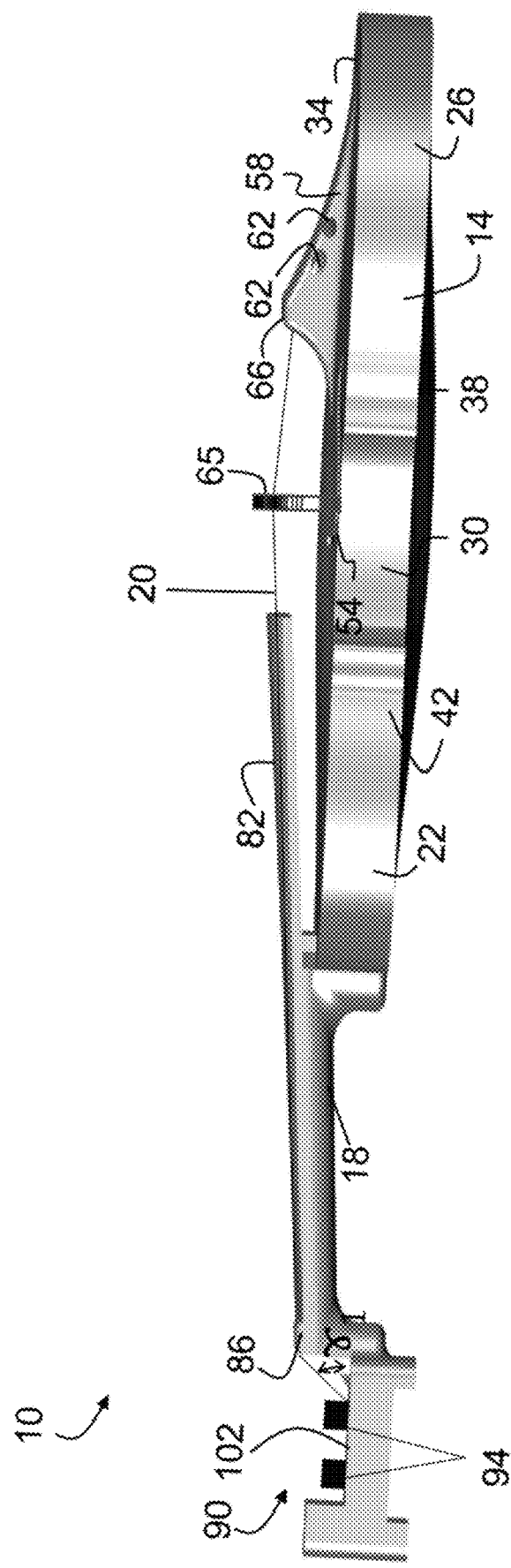
FIG. 3 is a side view of the stringed instrument of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring generally to the figures, two complete embodiments of a string instrument are illustrated. The first embodiment is illustrated in FIGS. 1-12 and the second embodiment is illustrated in FIGS. 13-26. It should be noted that the supports illustrated in FIG. 12 and FIGS. 24-26 are interchangeable with the two embodiments.

Figure 13:
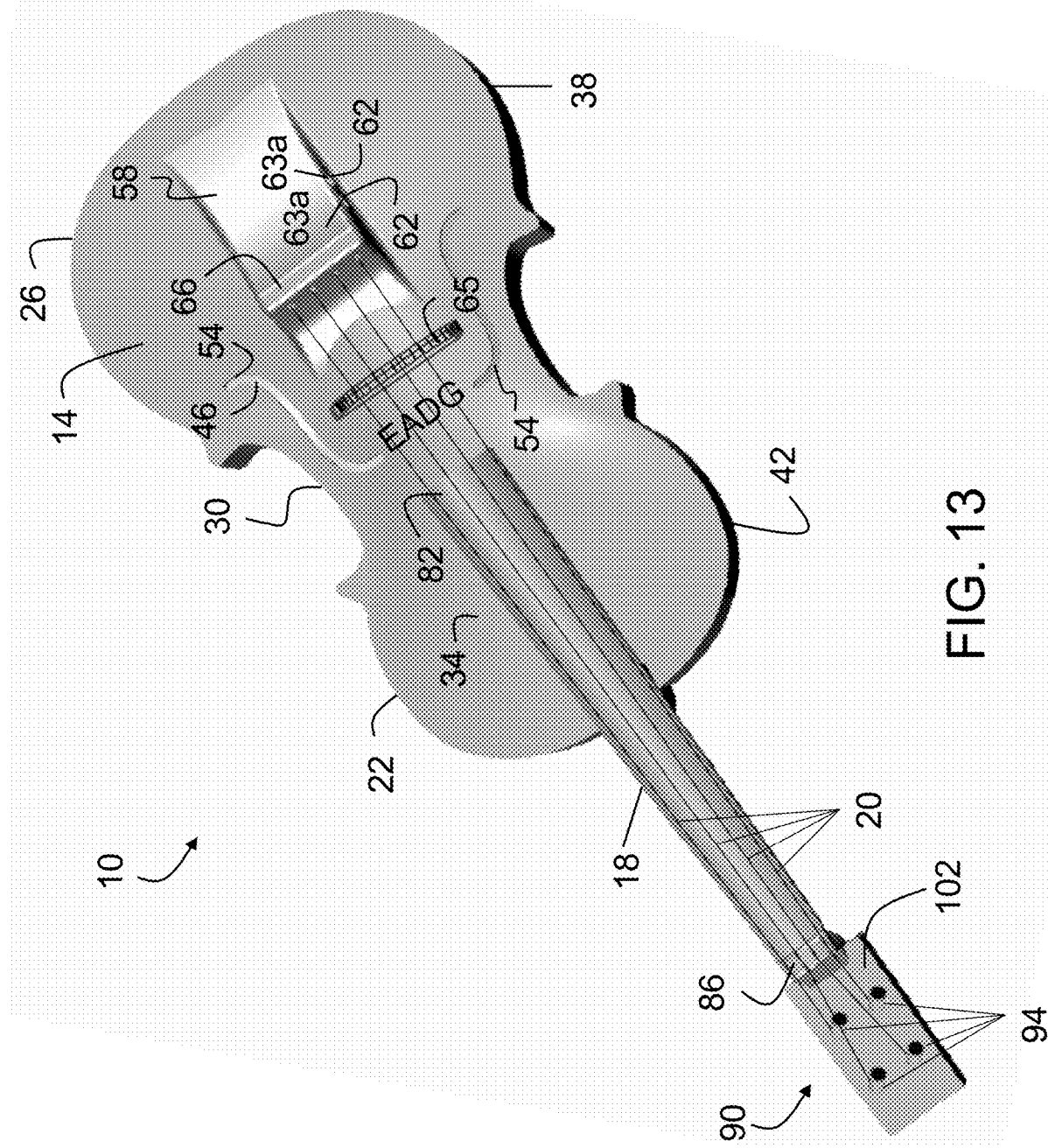
FIG. 13 is an elevational view of a stringed instrument of the present invention.
Figure 14:
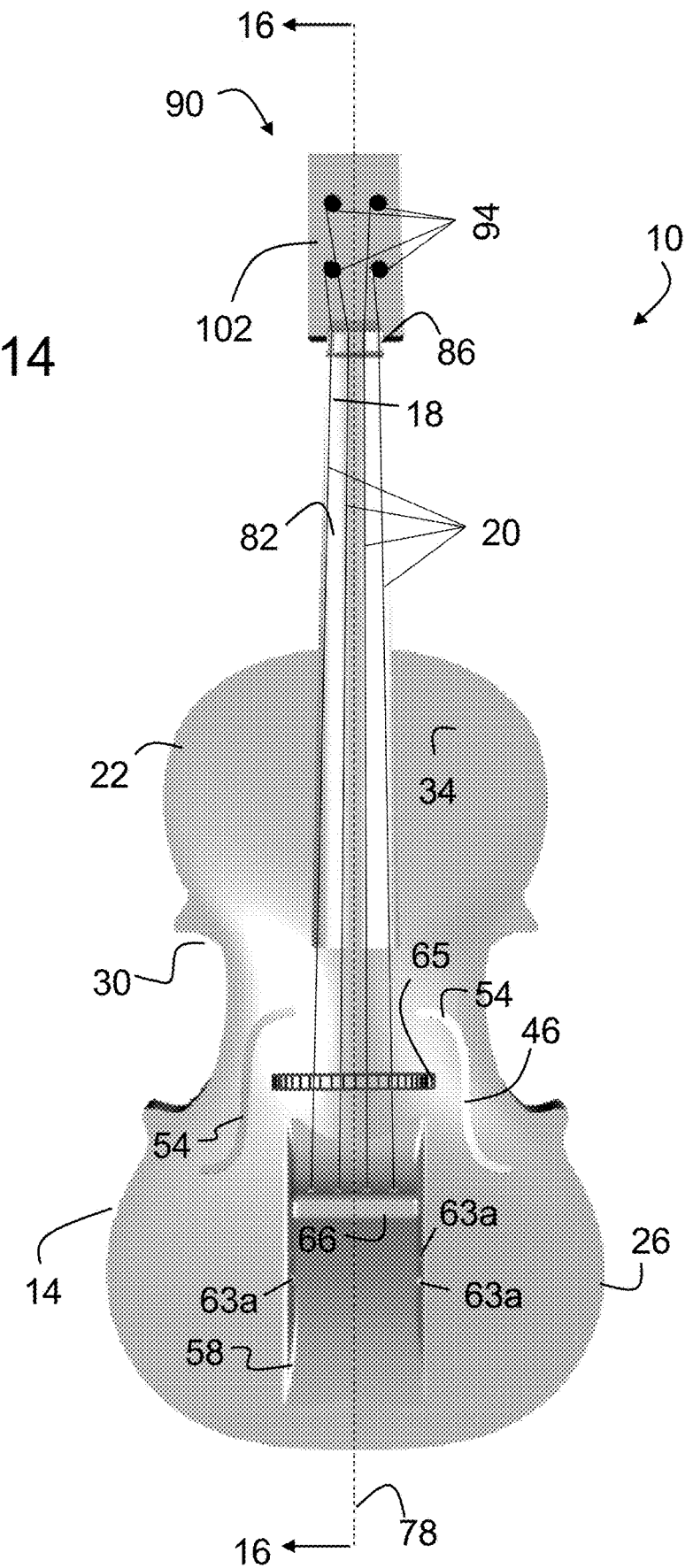
FIG. 14 is a top view of the stringed instrument of FIG. 13.
Figure 15:
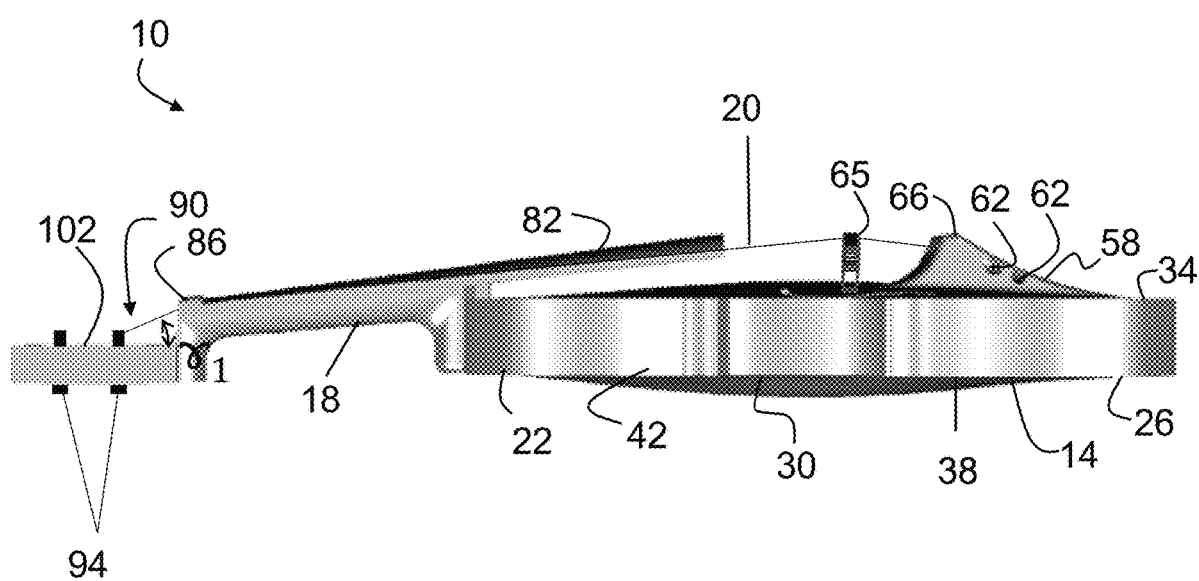
FIG. 15 is a side view of the stringed instrument of FIG. 13.

Referring to FIGS. 1 and 13, a violin 10 has a body 14 attached neck 18. The body 14 and the neck 18 are generally produced separately and subsequently assembled. Strings 20, generally four tuned in perfect fifths with notes G3, D4, A4, E5, are tensioned between the body 14 and neck 18 and attached thereto. It is contemplated that the stringed instrument described herein is produced via additive manufacturing on a 3D printer. Thus, the body 14 and neck 18 are produced from polymeric materials, such as a polylactic acid. Alternatively, the body 14 and neck 18 can be produced from acrylonitrile butadiene styrene, derivatives of acrylonitrile butadiene styrene, and/or polycarbonates.

The body 14 has a roughly hourglass shape. An upper bout 22 is separated from a wider lower bout 26 by a center bout, or waist, 30. The center bout 30 is generally narrower than the upper and lower bouts 22,26. A top plate 34 is joined to a back plate 38 by a rib 42 which forms a side wall of the violin 10. This construction forms an interior volume 46 within which a soundposts 50a,b rigidly span interior surfaces of the top and back plated 34,38 (see, e.g. FIGS. 4, 6, and 7 and FIGS. 16, 18, and 19). The body 14 has a unibody construction such that the upper, center, and lower bouts 22,30,26, the top and back plates 34,38 and the soundposts 50a,b are formed in a single piece, one-piece, construction, such that all these components are integral with each other and no further means of attachment, such as fasteners, glue, welding, etc., is necessary to assemble the body 14.

The top plate 34 has a pair of openings 54 located on opposing sides of the plate 34. The openings 54 are generally s-shaped or f-shaped and are located primarily within the center bout 34 and extend into the lower bout 26. The openings 54, combined with the interior volume 46 promote resonance of the violin 10 when played.

The top plate 34 further has a tailpiece 58 forming a raised surface. The tailpiece 58 has four string bores 62 which are used to attach strings 20 to the body 14 (see, e.g., FIGS. 9 and 21). The tailpiece 58 is integral with the remaining portions of the top plate 34 and is located primarily on the lower bout 26 of the body 14 and extends to an intersection between the lower bout 26 and the center bout 30. A protrusion of the tailpiece 58 begins at a length to promote a ⅛ to ⅙ ratio (described in more detail below).

The tailpiece 58 structure comprises a shell wall which defines a volume between the shell and the top plate 34. Additive manufacturing infill fills the volume to provide strength, and rigidity to the tailpiece 58.

Pairs of the string bores 62 have string entrances 63a to the tailpiece 58 along opposing sidewalls of the tailpiece 58 shell. The string bores 62 form aligned string exits 63b on a front face of the tailpiece 58 shell. The string bores 62 have variably sized cross-sections to retain ball ends of the strings 20 within the string bores 62. Stated another way, the string entrances 63a have a greater cross-sectional size to allow the ball ends to enter the string bores 62 but the string bores' cross-sectional area decreases at some point at a throat 64 along each string bore length such that the ball ends frictionally engage string bore sidewalls to retain the ball ends within the string bores 62.

In an embodiment of the invention, the string bores 62 are tubes formed within the tailpiece 58. Further, the string bores 62 are shifted upward and each string bore throat 64 is located within the tail piece 58 which holds the ball-end at a specific location within the tail piece 58 such that string bores 62 are fully covered and the tailpiece 58 becomes more stable with less extra input resonance from the thin walls of prior designs.

In one embodiment, the string bores 62 are positioned wherein the string bores 62 all change diameters at substantially a same height above the top plate 34. Each throat 64 has an entry end 64a and an exit end 64b. The cross-section areas of each string bore 62 begin to decrease between the entry end 64a and the exit end 64b of each throat 64. In one embodiment, the cross-sectional areas progressively decrease from the entry end 64a to the exit end 64b. A short tubular segment 62a of each string bore 62 joins each throat 64 to the string exits 63b. Here, the term substantially refers to within ±1 mm.

With some violins 10 produced using additive manufacturing, the string placement on is uneven and much wider than any handmade or traditional violin. In one embodiment of the invention, a spacing between the strings 20 is uniform and fits on a standard ¼-size bridge 65. The string bores 62 of this embodiment are out-of-round at least at the string exits 62b of the tailpiece 58 and preferably have an oval cross-section having a minor axis normal to a plane defined by an upper surface 66 of the tailpiece 58 and a major axis parallel to the plane. These string exits 62b of the string bores 62 allow the strings 20 to shift as the strings 20 are placed into tension such that the strings 20 land optimally on the bridge 65 with minimal extra tension.

The bridge 65 is a decorative and functional member that balances underneath the strings 20 and transmits vibrations from the strings 20 into the body 14 of the violin to create sound. The bridge 65 of the violin 10 is not glued or attached to the body 14. Instead, the bridge 65 is held in place by a tension of the strings 20. The force that the strings 20 exert on the bridge 65 of a standard violin is equal to about 90 pounds.

In an embodiment, a height of the tailpiece 58 is selected lower than on prior designs produced from additive manufacturing. A standard violin has a nut-to-bridge-to-tailpiece ratio of ⅙ and a bridge length, measured from a top nut 86 (see below) and/or the tailpiece 58, is set based on the violin type. That is, a distance from the bridge 65 to the tailpiece is ⅙ a distance of the top nut 86 to the tailpiece 58. To meet the required ratio and maintain standard sizing, the tailpiece 58 extends towards the lower bout 26 downwardly on the body 14. In additive manufacturing. the downward movement had to insure printability and keep the string bores 62 correctly positioned within the tailpiece 58. Stated another way, The tailpiece is moved downwardly in a direction from the center bout 30 towards the lower bout 26 such that the tailpiece 58 is positioned to achieve the ⅛ to ⅙ ratio whereas prior violin design produced using additive manufacturing did not achieve the ratio because a length of the top nut to the tailpiece 58 was too short. A printability of overhangs was what was accounted for in setting the minimum height of the tailpiece 58 from a lowermost portion of the top plate 34. "Overhang" is a printing term for when something is building out on a layer smaller than it, like that of a building.

In one embodiment the nut-to-bridge-to-tailpiece ratio of and a bridge length, measured from a top nut 86 and/or the tailpiece 58, is less than or equal to %. In another embodiment, the ratio is less than %. In another embodiment, the ratio is greater than or equal to % and less than %.

The soundposts 50a, b are located inside the violin 10, under a right side of the bridge 65. One soundpost 50a is located below an E string side of the bridge 65, and the second soundpost 50b is located below a G string side of the bridge 65. The soundposts 50a,b transmit vibrations of the strings 20 into the body 14 of the violin 10 to create sound, and their placement can change the quality of that sound, in terms of volume and/or tone quality.

As best illustrated in FIGS. 5-7 and FIGS. 17-19, in an embodiment of the invention, the body 14 has a pair of soundposts 50a, b. A second soundpost 50b mirrors the location of a first soundpost 50a. Thus, the second soundpost 50b is located on the opposite side of the bridge 65 under the G string at the same height as the first soundpost 50a. Further, most traditional violins also have a bass bar within the interior volume 46 below the G string. However, in this embodiment the bass bar is removed in favor of the second soundbar 50b. This removes "wolfing" and/or increases the resonance of more pure tones and removes the buzzing sounds when the strings 20 are played. Also, it stabilizes the body 14 at bridge height near where the openings 54 and the bridge 65 meet to prevent the tension of the strings 20 from collapsing the body 14.

As illustrated in FIGS. 6 and 7 and FIGS. 18 and 19, a top end block 67 is also located with the interior volume 56 at the uppermost portion of the upper bout 22. The top end block 67 provides stability to the body 14. It is located inwardly of an external notch 70 in the body 14, which provides a means for attaching or locating the neck 18 on the body 14 when the violin 10 is assembled.

Figure 4:
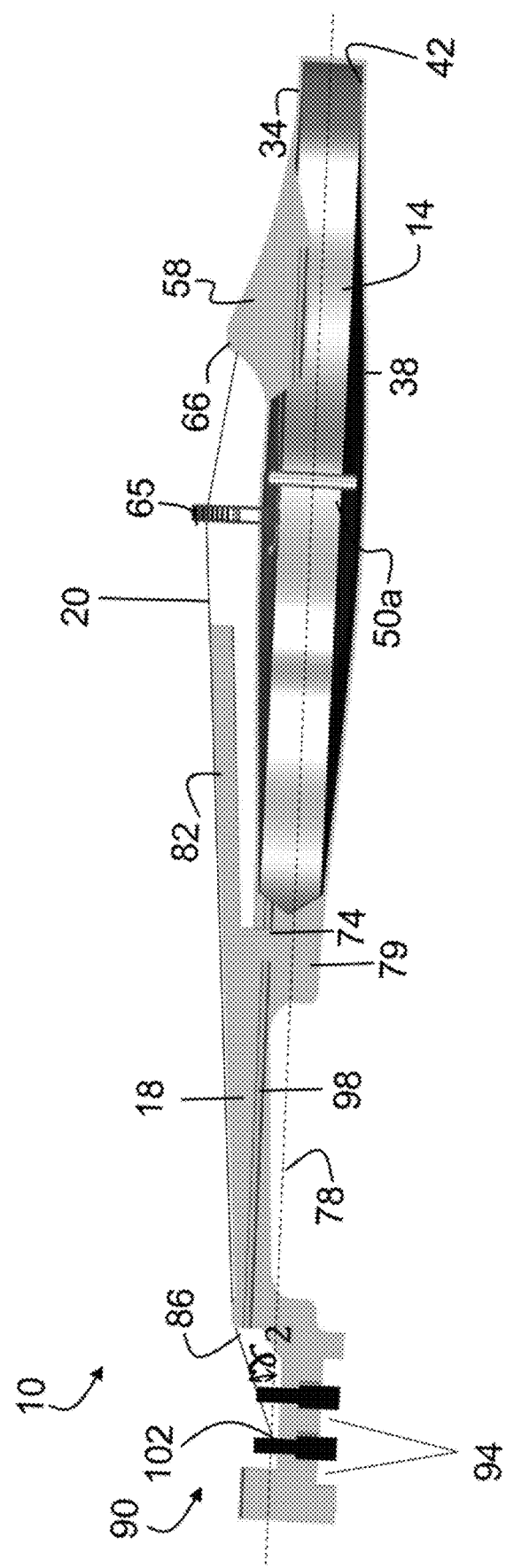
FIG. 4 is a cross-sectional view of the stringed instrument of FIG. 1 taken through 4-4 of FIG. 2.
Figure 5:
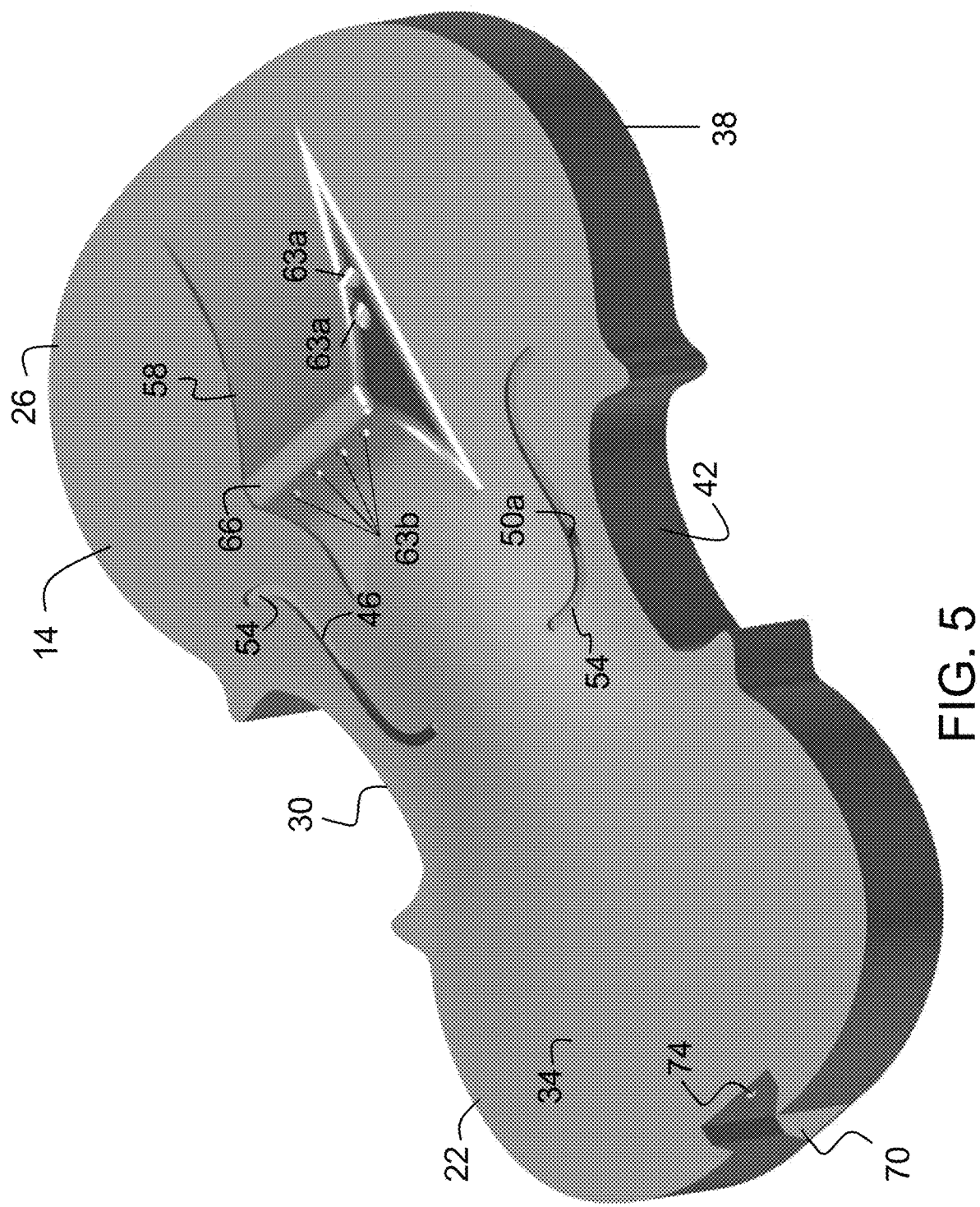
FIG. 5 is an elevational view of the body of the stringed instrument of FIG. 1 with the strings and bridge removed for clarity.
Figure 6:
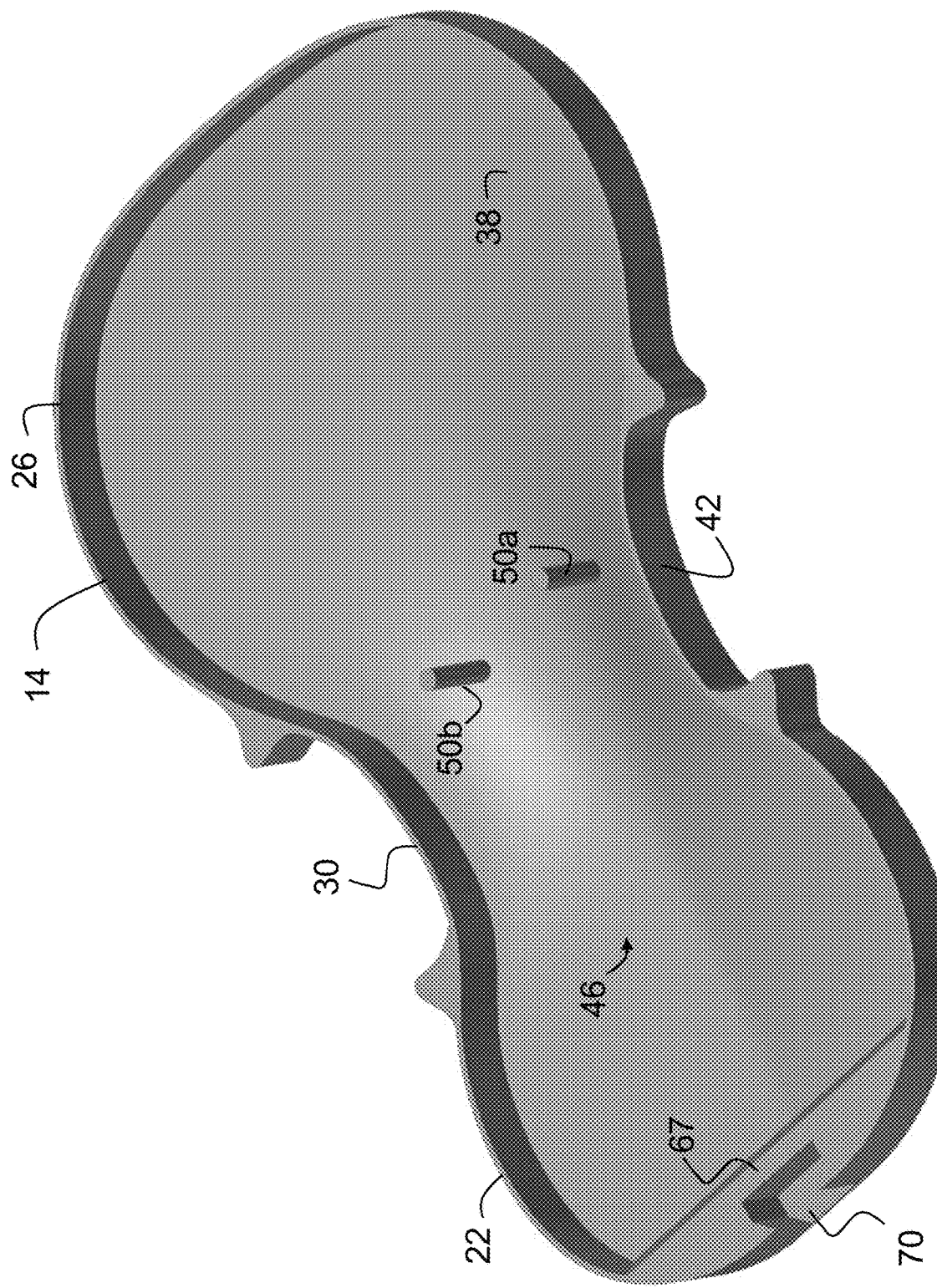
FIG. 6 is an elevational view of the top of the body of the stringed instrument of FIG. 1 with the top plate removed to show the soundposts.
Figure 7:
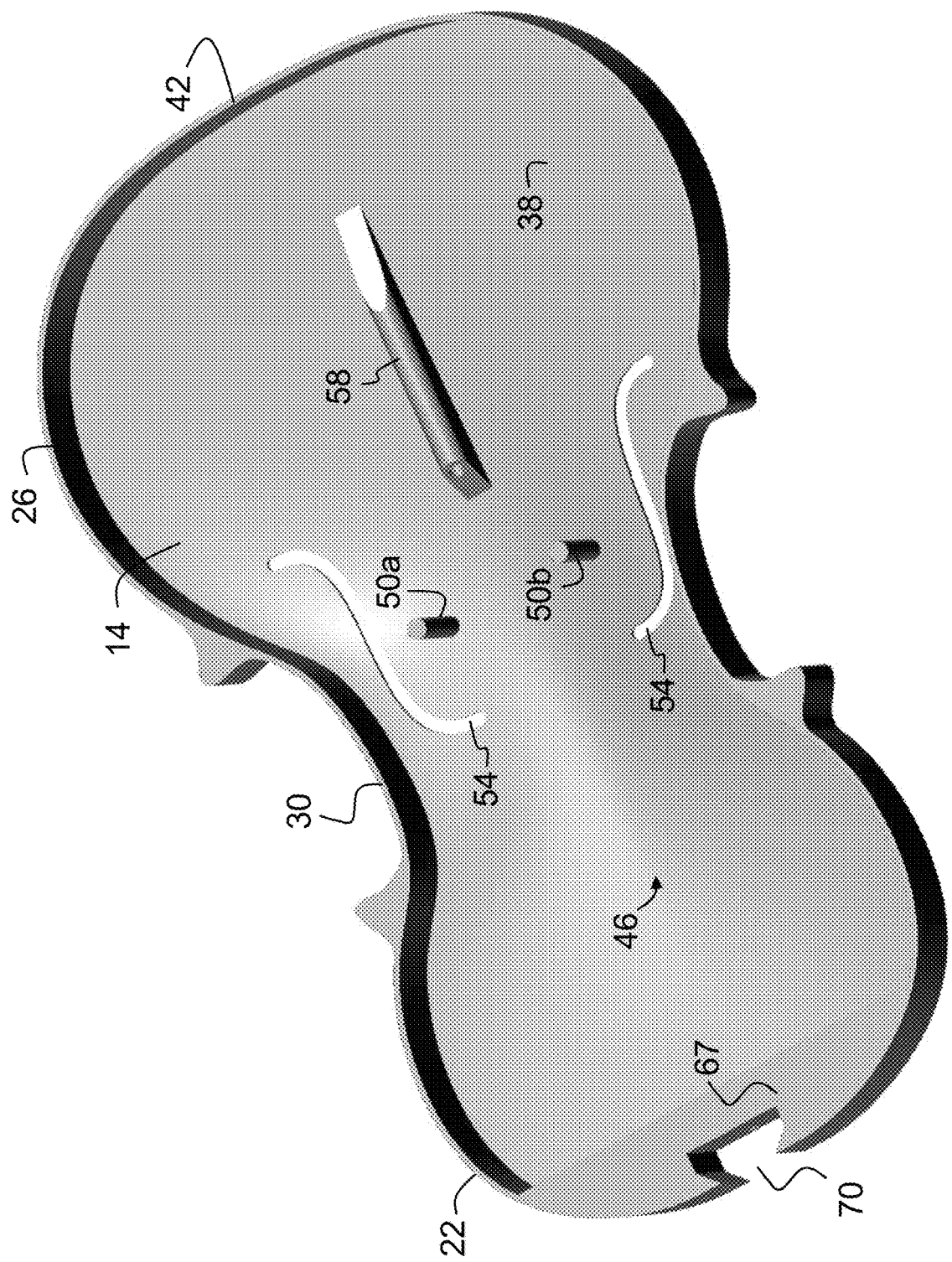
FIG. 7 is an elevational view of the bottom body of the stringed instrument of FIG. 1 with the bottom plate removed to show the soundposts in relation to the openings in the top plate.
Figure 8:
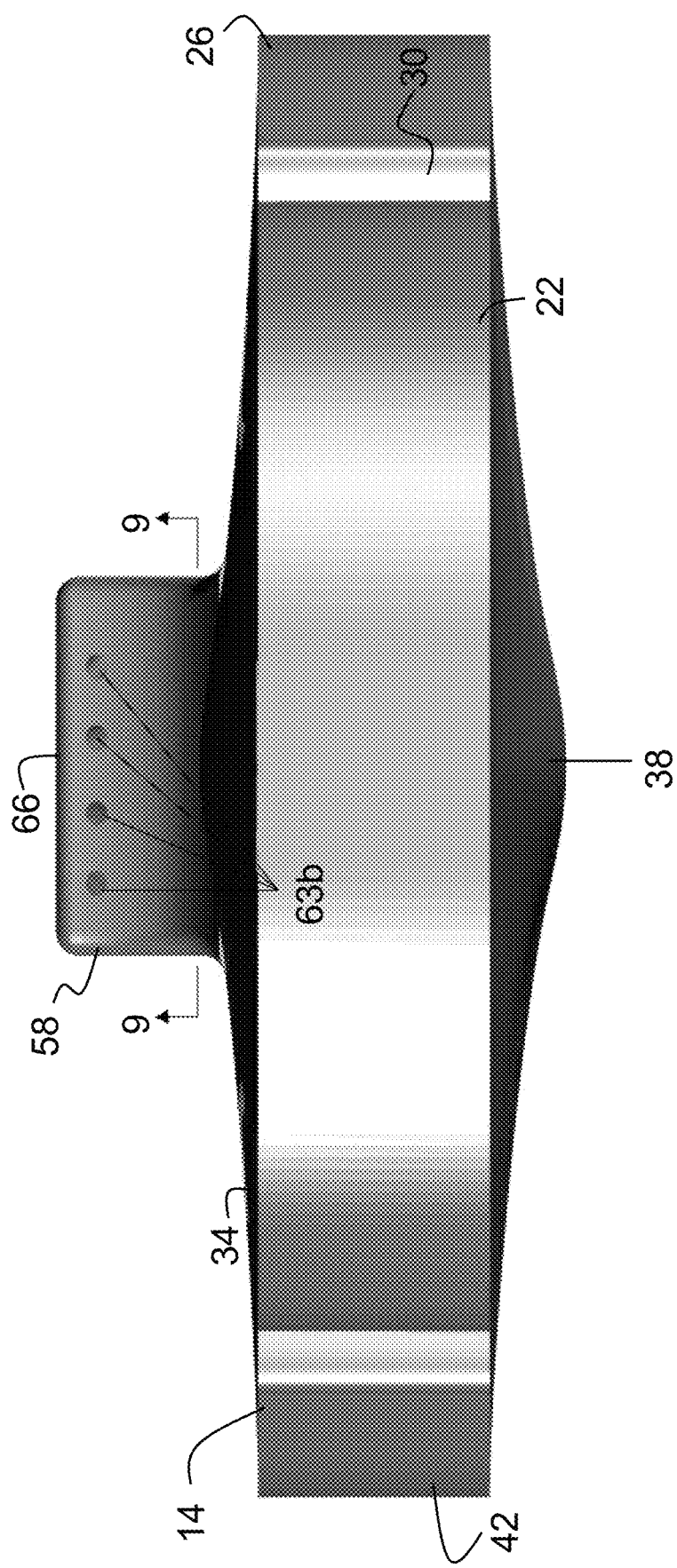
FIG. 8 is a front view of the body of the stringed instrument of FIG. 1 with the strings and bridge removed for clarity to show the oval-shaped exits apertures in the tailpiece.
Figure 9:
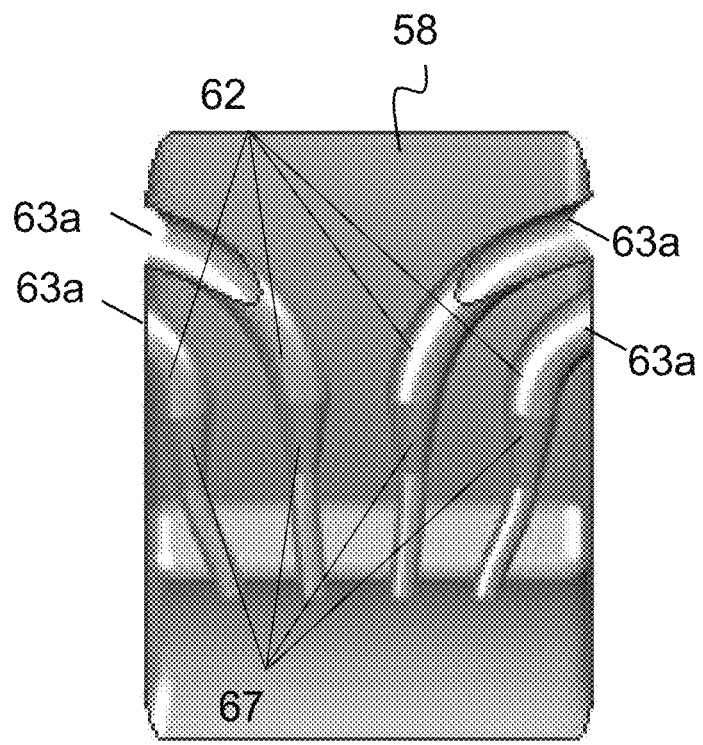
FIG. 9 is a magnified cross-sectional view taken through 9-9 of FIG. 8, showing the string bores within the tailpiece.
Figure 10:
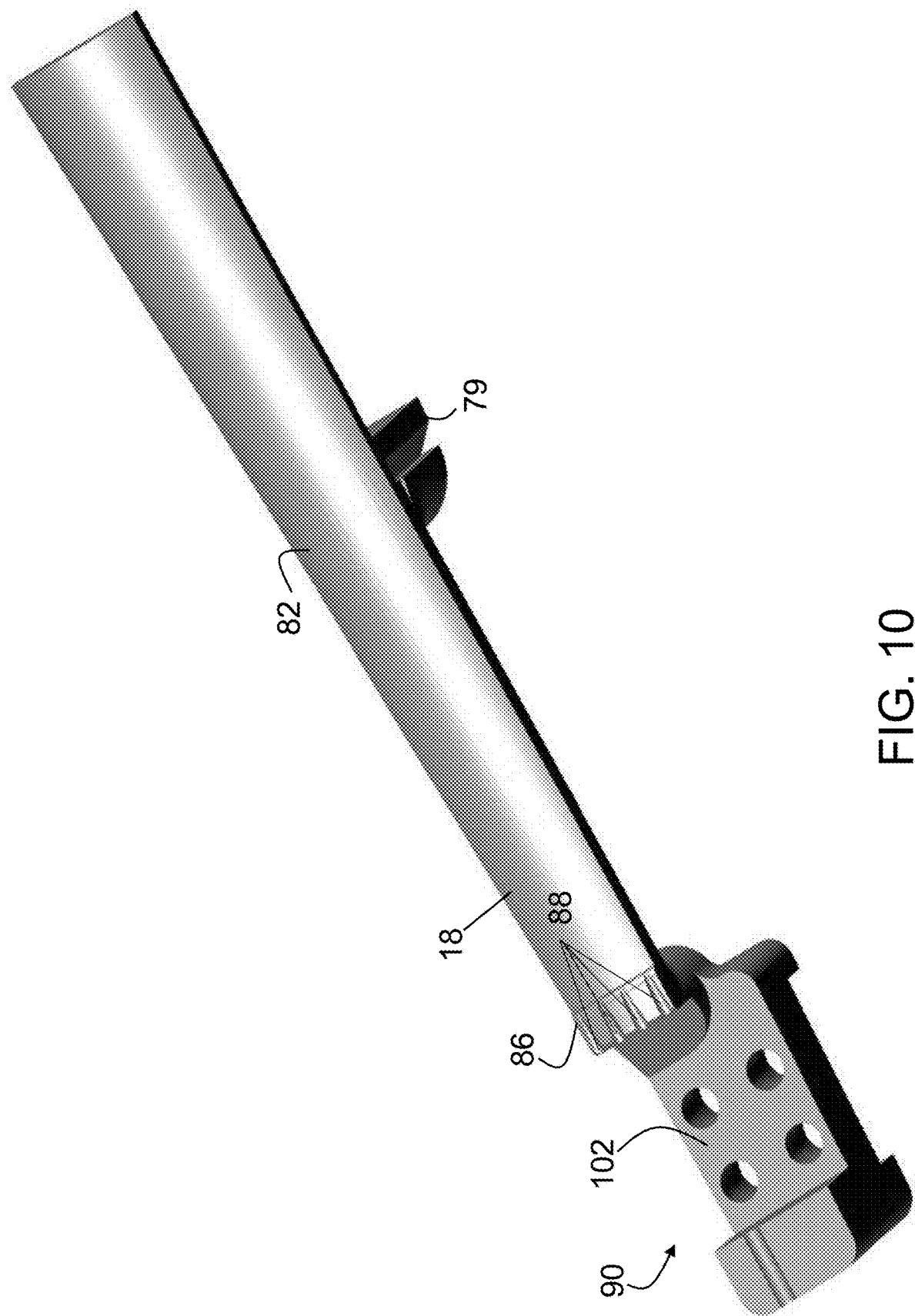
FIG. 10 is an elevational view of the top of the neck of the stringed instrument of FIG. 1 with the strings removed for clarity.
Figure 11:
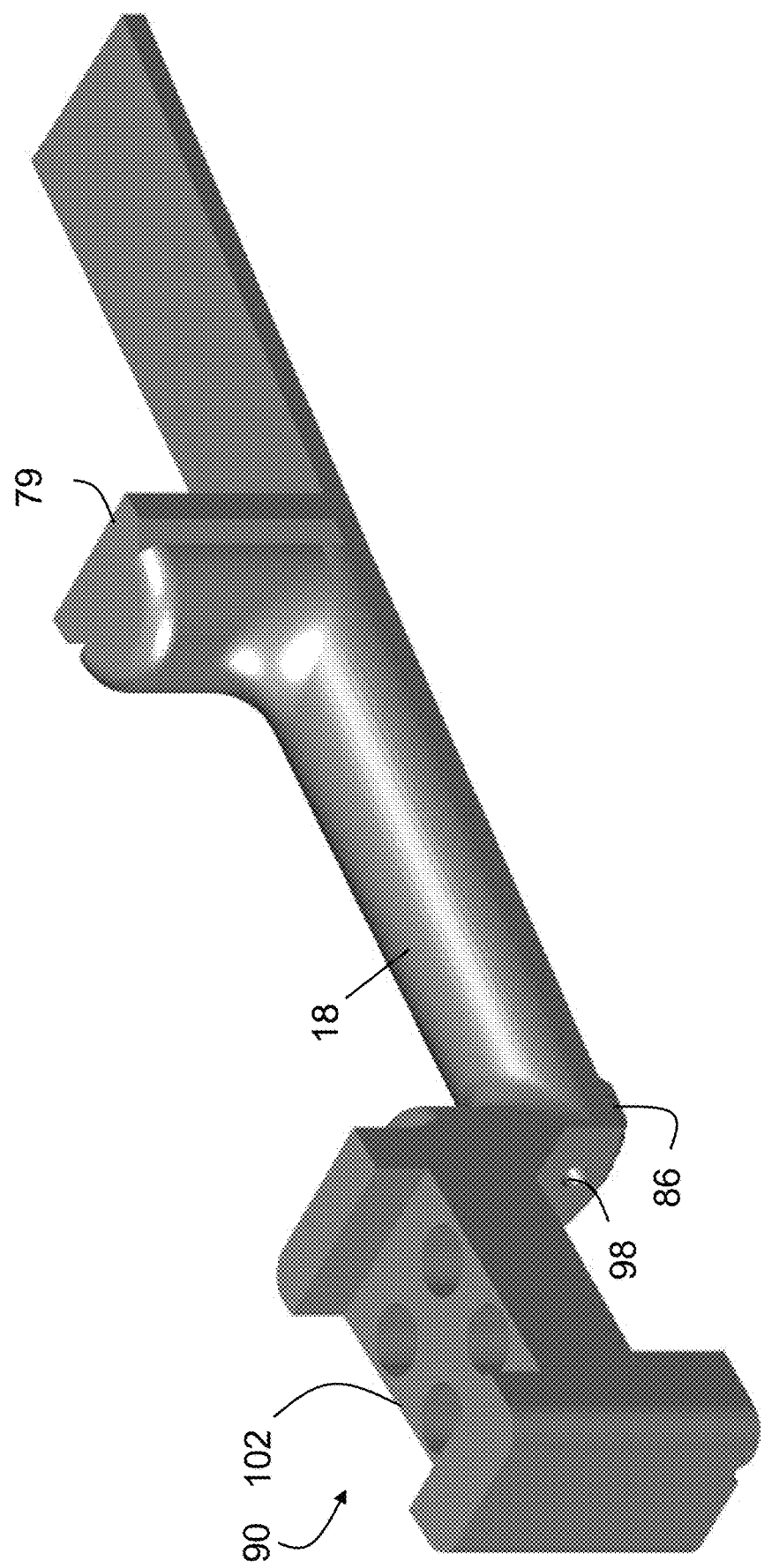
FIG. 11 is an elevational view of the bottom of the neck of the stringed instrument of FIG. 1 with the strings and bridge removed for clarity.
Figure 12:
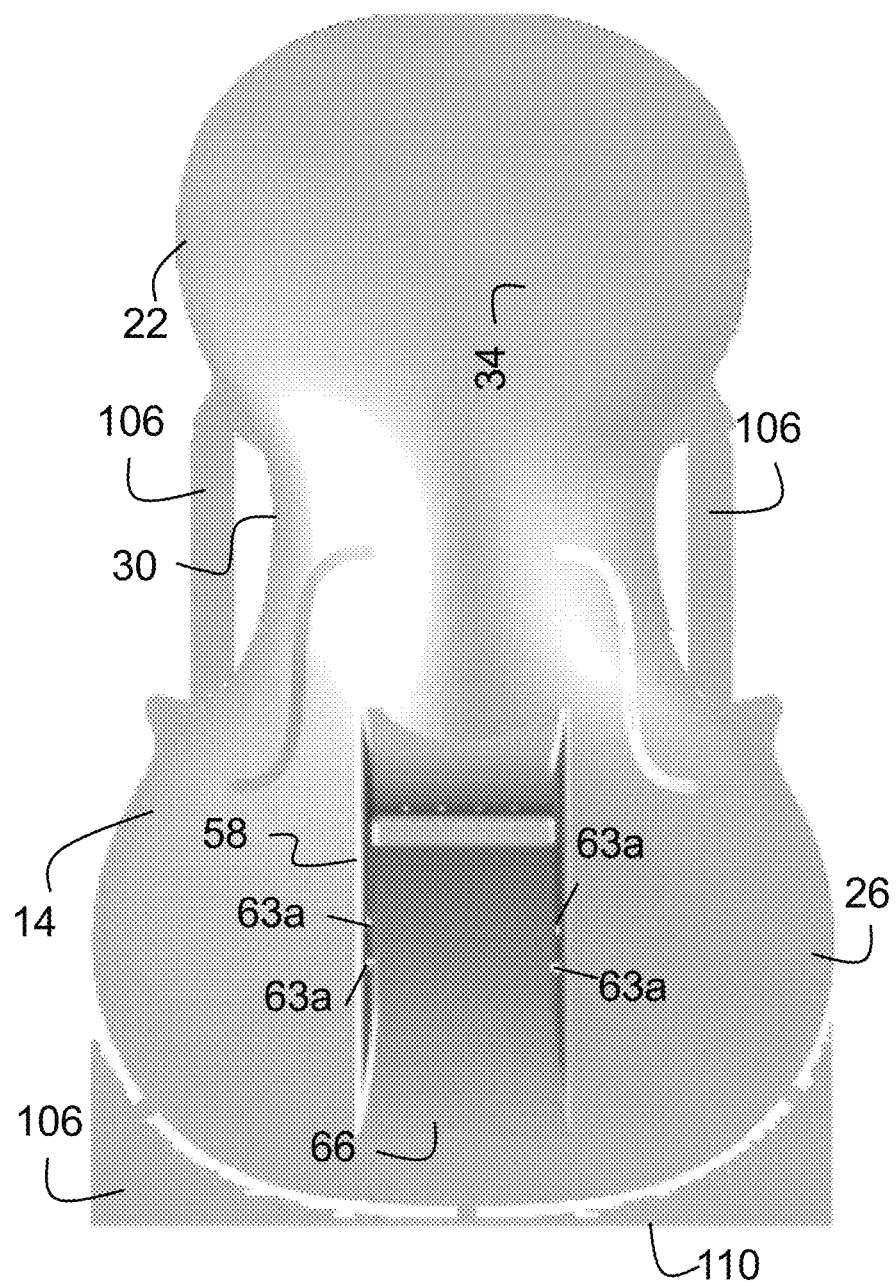
FIG. 12 is a front view of a stringed instrument body supported on a support during 3D printing.
Figure 16:
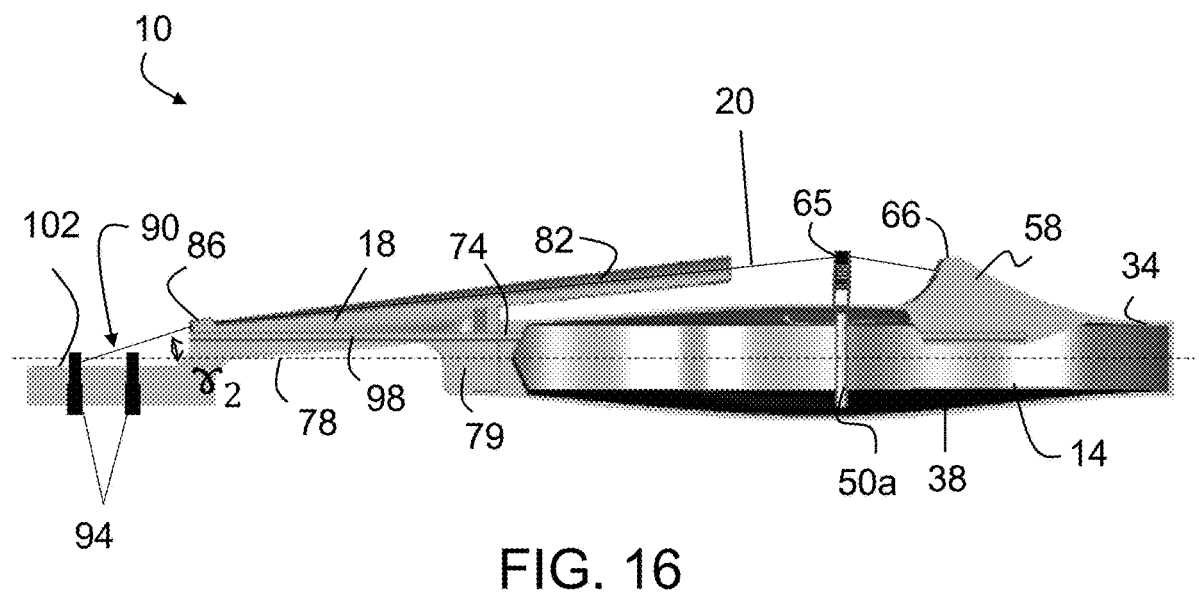
FIG. 16 is a cross-sectional view of the stringed instrument of FIG. 13 taken through 16-16 of FIG. 14.
Figure 17:
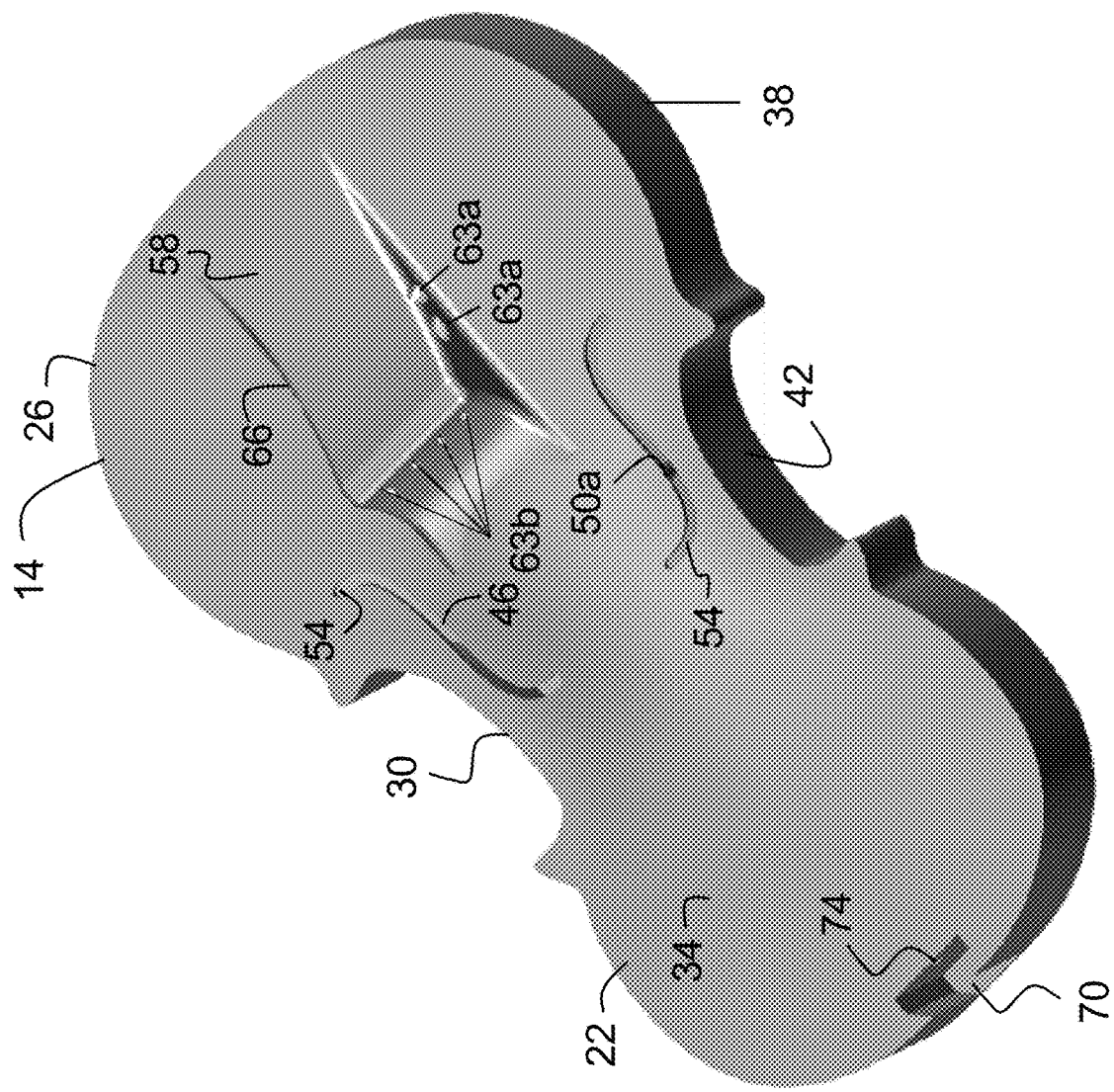
FIG. 17 is an elevational view of the body of the stringed instrument of FIG. 13 with the strings and bridge removed for clarity.
Figure 18:
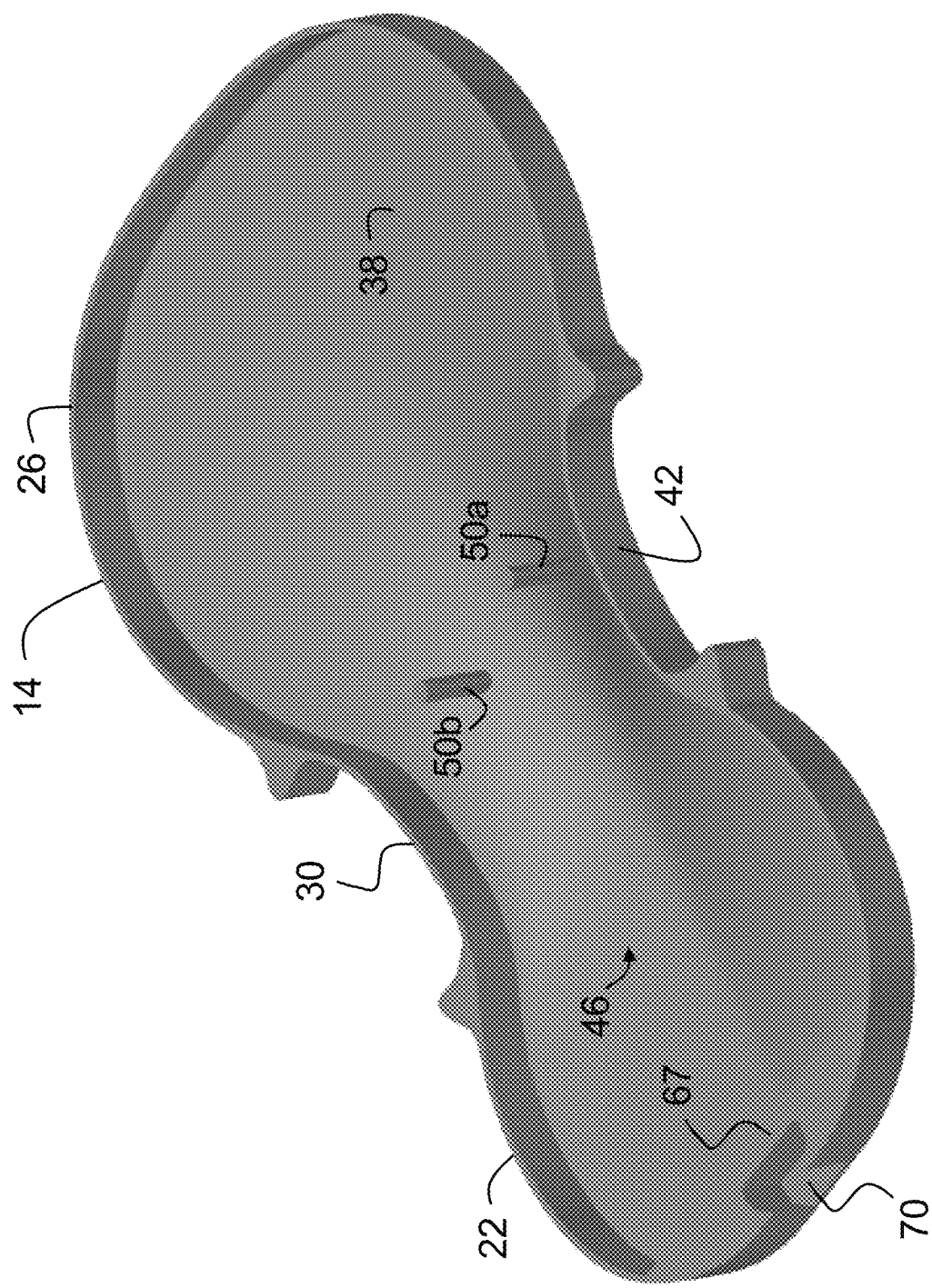
FIG. 18 is an elevational view of the top of the body of the stringed instrument of FIG. 13 with the top plate removed to show the soundposts.
Figure 19:
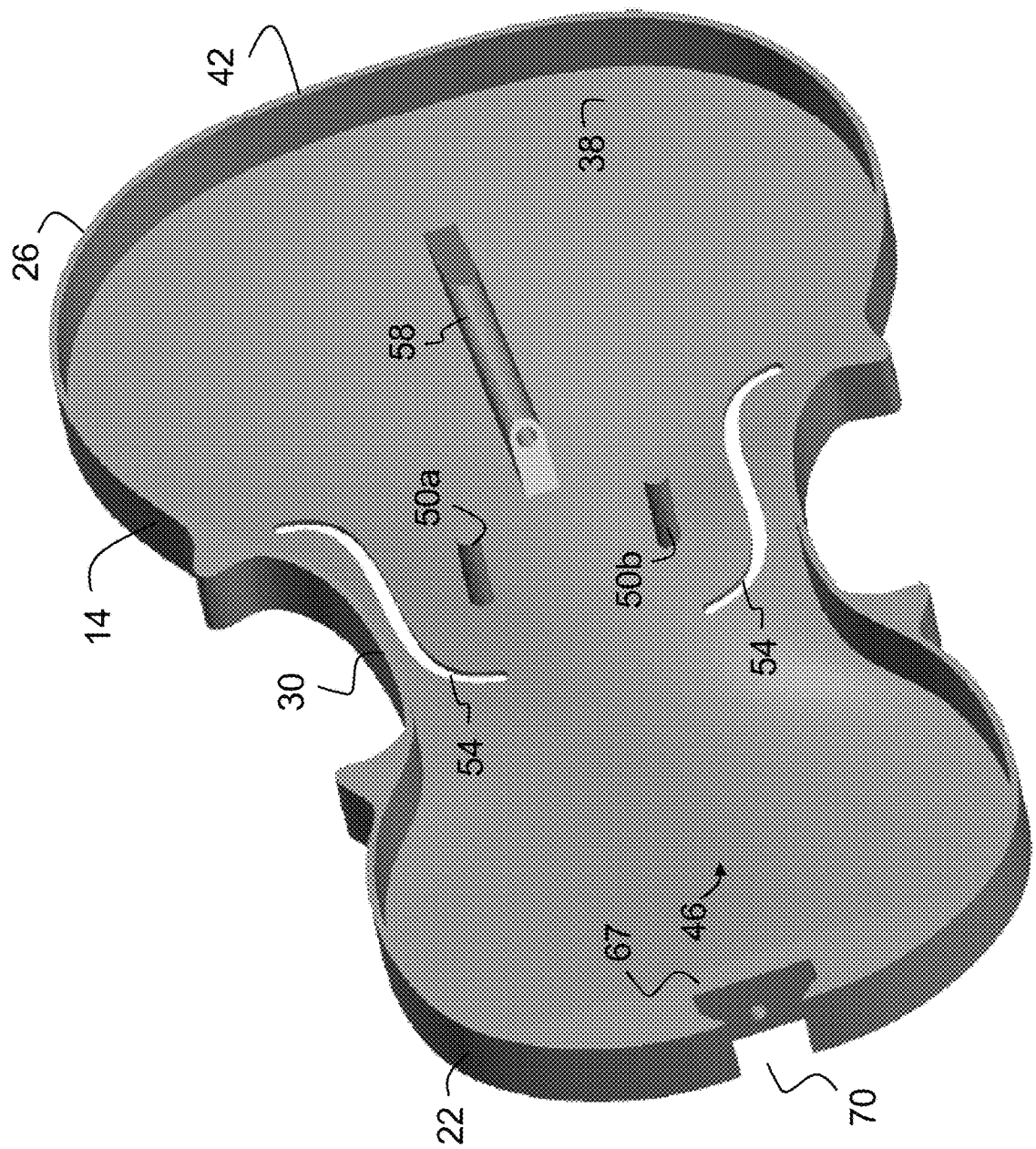
FIG. 19 is an elevational view of the bottom body of the stringed instrument of FIG. 13 with the bottom plate removed to show the soundposts in relation to the openings in the top plate.
Figure 20:
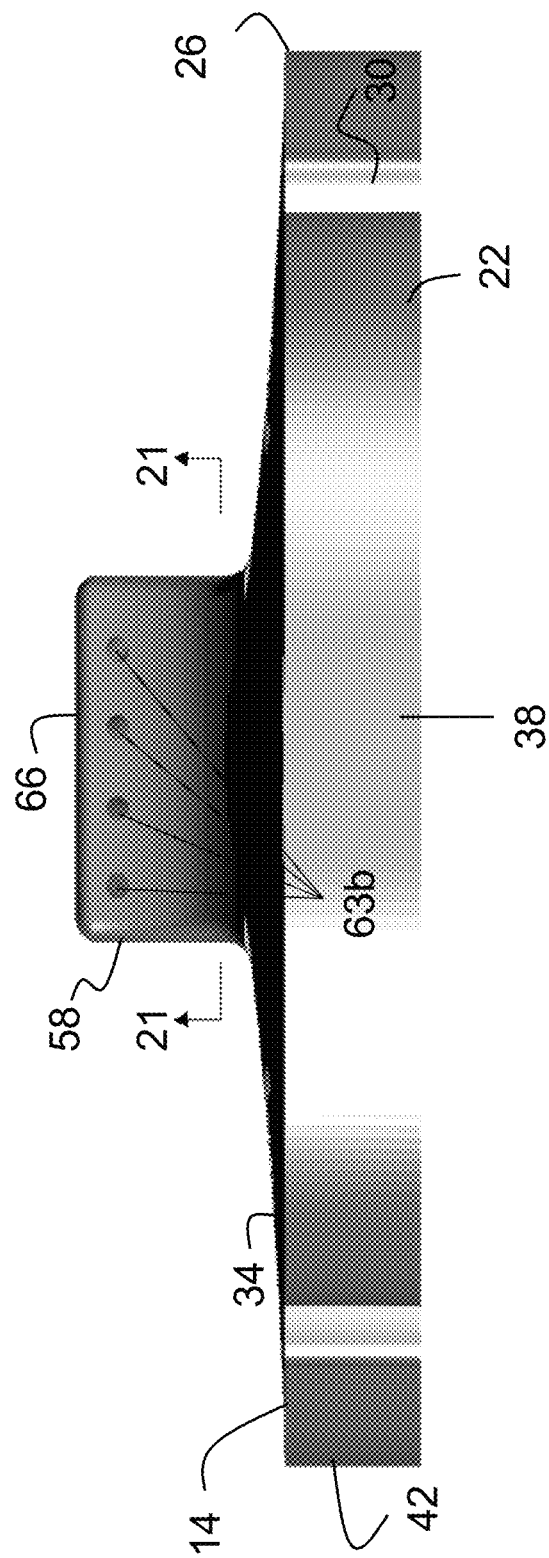
FIG. 20 is a front view of the body of the stringed instrument of FIG. 13 with the strings and bridge removed for clarity to show the oval-shaped exit apertures in the tailpiece.
Figure 21:
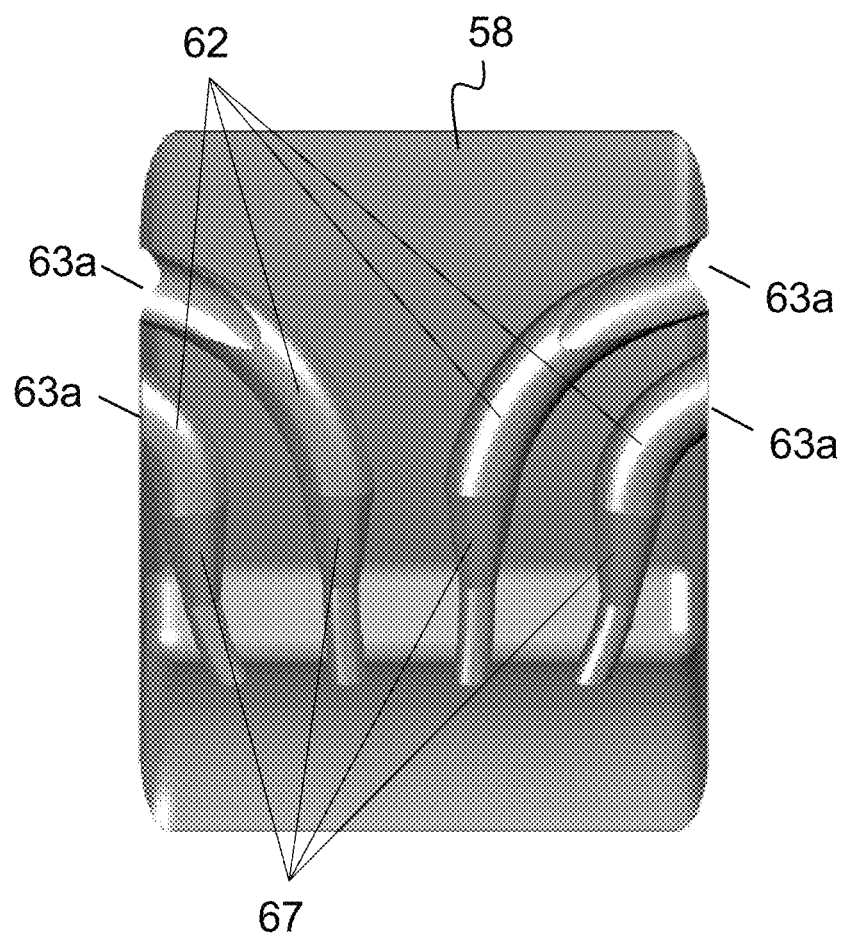
FIG. 21 is a magnified cross-sectional view taken through 21-21 of FIG. 20, showing the string bores within the tailpiece.
Figure 22:
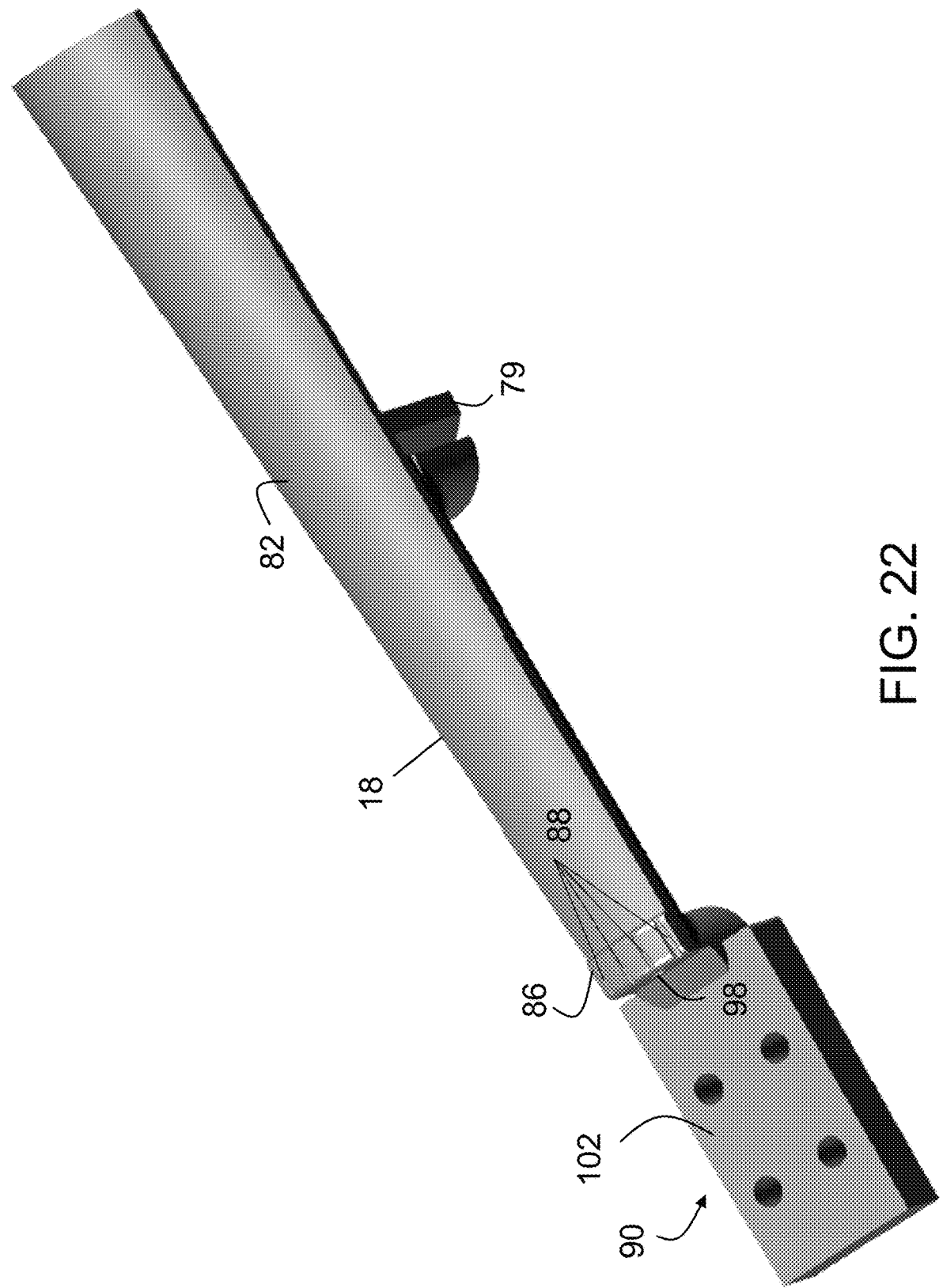
FIG. 22 is an elevational view of the top of the neck of the stringed instrument of FIG. 13 with the strings removed for clarity.
Figure 23:
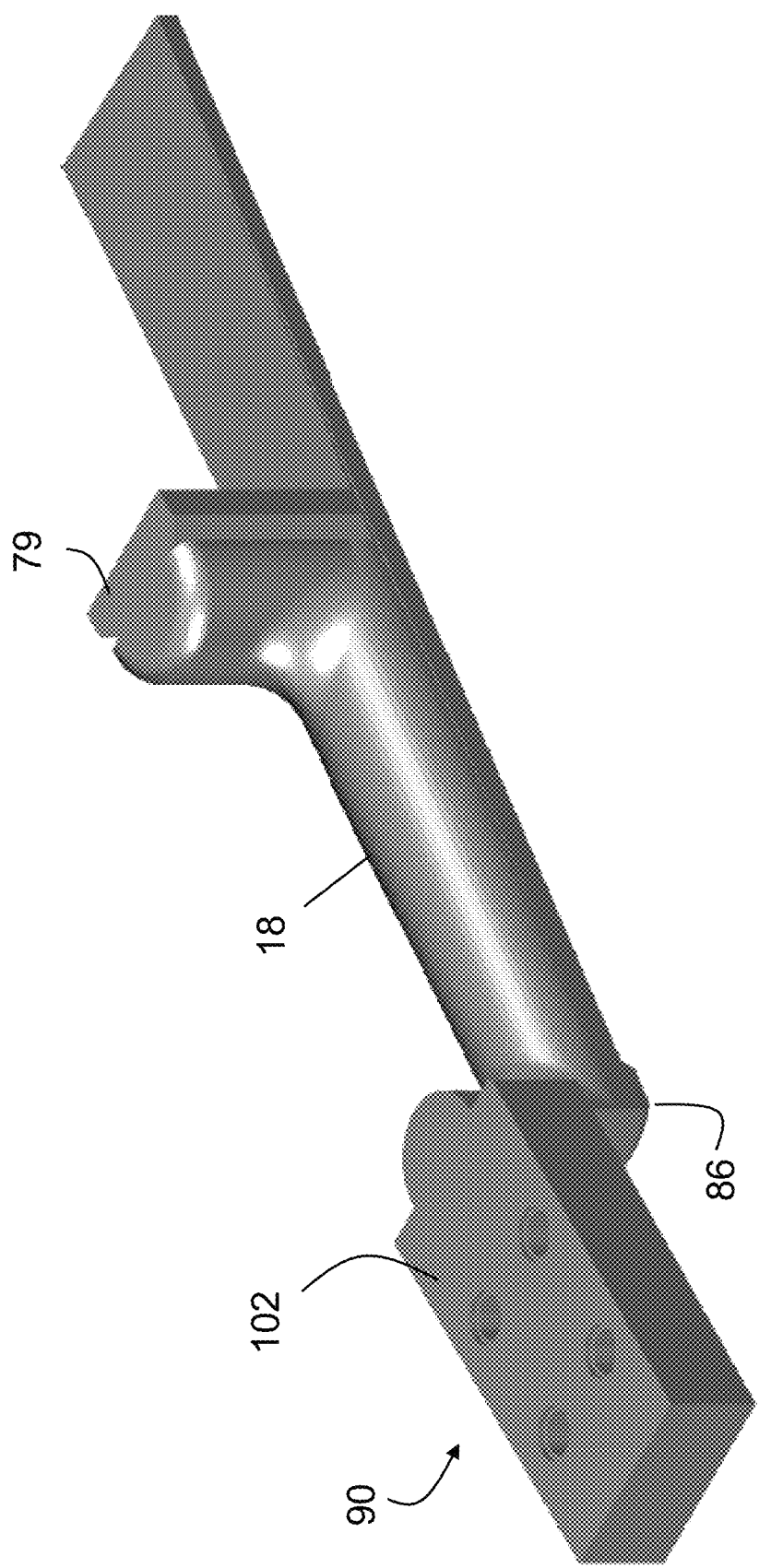
FIG. 23 is an elevational view of the bottom of the neck of the stringed instrument of FIG. 13 with the strings and bridge removed for clarity.

As shown in FIGS. 4 and 16, a passageway 74 is formed at the uppermost portion of the upper bout 22. The passageway forms a fluid communication from the interior volume 46 to an outside of the interior volume 46. The passageway 74 passes through the side wall of the body 14 and forms an angle with side wall at the point which it passes therethrough that is greater than zero degrees. More preferably, the passageway 74 is within ±30 degrees of parallel with a vertical axis 78 which passes down a length of the neck 18, bisecting the body 18 along longitudinal and transverse directions.

The neck 18 is separable from the body 14 and is attached to the body 14 via, at least, frictional engagement of a friction-fit of a button 79 within the notch 70. The button 79 is an appendage extending outwardly from a back of the neck 18 and transverse to the vertical axis. A top surface of the neck 18 forms a fingerboard 82 from the center bout 30 to a top nut 86. The top nut 86 includes string guides 88 to maintain alignment of the strings 20 above the fingerboard 82. The top nut 86 separates the fingerboard 82 from a tuner box 90. The tuner box 90 includes four tuners 94 which are rotatable within apertures. The strings 20 are wound about the tuners 94 to tighten and loosen the strings 20 as necessary to tune the strings 20 to make the desires sounds.

In an embodiment of the invention, an angle and length combination of the neck 18 is configured to provide 22 mm of height above the top plate 34 at the location of the bridge 65. An open-source additive manufacturing file of a violin neck was designed to be printed on a wide variety of machines; however, the neck length was drastically shorter than that of a traditional ¼ size violin and therefore was missing more than an octave of notes. By changing the length, it added guidance for determining the appropriate neck angle as well as providing the ability to play all of the same notes as the wooden counterpart violin.

In a prior violin produced via additive manufacturing, strings 20 passed through holes in the top nut 86 rather than over the top of the top nut 86, and the violin had a much shorter neck extension over the upper bout 22 of the body 14. Thus, the ratio was not accurately determinable. Once the neck 18 length was made to be accurate to a ¼ size violin and the top nut 86 was changed to be external, there were still acoustical issues, and the standard ratio of spacing between the top nut 86 to the bridge 65 distance, and the bridge 65 to tailpiece 58 distance of ⅙ was not being met. In one embodiment, an angle and length of the neck 18 angle is configured to position an upper side of the bridge 65 at 22 mm, and the tailpiece 58 is moved downwardly in the direction farther away from the center bout 30 and towards or along the lower bout 26, the ⅙ ratio could be obtained to within 1 mm and the majority of echoes and acoustic flaws were removed or diminished.

As described above, prior violins of this type produced via additive manufacturing featured uneven string spacing. This uneven spacing was designed to accommodate a neck central bore 98 and because the strings 20 were imbedded within the top nut 86. In an embodiment of the present invention, in order to fix the uneven tensions caused by differing angles from the strings 20 to the tuners 94, the string guide spacing is even and the tailpiece 58 orientations were changed to be the same shape and profile orientation to accommodate for the change to an exterior strung top nut/string interface. More specifically, the string exits 63a are oriented such that each string exit 63a is pointed towards a corresponding string guide 88 and the nut-to-bridge-to-tailpiece spacing is proper for a desired sized bridge, e.g. a ¼ sized bridge.

Again, according to a prior art violin produced via additive manufacturing, the top nut 86 included holes through a block or body member to direct the strings 20 towards the tuners 94. This drastically increased tension in the strings 20 to where the strings 20 could not be stored in tension without snapping. By respacing the strings 20 so that the strings 20 are evenly spaced and by providing open-top string guides 88 on the top nut 86 with a straight path like a traditional ¼ violin, the tension was dramatically decreased and the sound quality was increased due to the strings 20 no longer being constricted.

After the top nut 86 is adjusted to allow for the strings 20 to be exposed, the strings 20 have a tendency to slip due to a significant tension decrease. In an embodiment of the invention, a height of the top nut 86 was decreased and heights of the string guide walls were increased and configured to maintain a height of the strings 20 above the fingerboard 82 constant, wherein the string guides on the top nut 86 prevent string slipping. The top nut 86 is designed to be a height of 1.5-2.5 mm (different for different stringed instruments) and terminating at a height above the fingerboard 82 according to an equation:

$$H_{TN} = \frac{D_{string}}{2} + \Delta H_{TN \to B} + K$$

where $H_{TN}$ is a height of the top nut 86 above the fingerboard 82, $D_{string}$ is a string diameter, $\Delta H_{TN \to B}$ is the minimum height of the top nut 86 above the bridge 65, and K is a correction factor between −0.5 mm to 0.5 mm, typically between 0 mm and 0.1 mm.

Further to a known violin produced using additive manufacturing, the strings 20 have a tendency to slip and produce undesired sound quality due to an uneven tuner 94 distribution required for consistent 3D printing. In one embodiment, a depth of the tuners 94 is increased and a string angle $\gamma_1$, $\gamma_2$ (see, e.g. FIGS. 3 and 4) from the top nut 86 to the tuner 94 is increased. The angle $\gamma_1$, generally the E and G strings, or the strings 20 secured to the tuners 94 closest to the top nut 86 (compare FIGS. 1 and 3 and FIGS. 15 and 16) is between 16° and 25° as measured from the tuner 94 to the top nut 86 upwardly from an axis parallel to the vertical axis 78, and preferably 21°±3°. Alternatively, the angle γ1, generally the E and G strings, or the strings 20 secured to the tuners 94 closest to the top nut 86 is between 30° and 38° as measured from the tuner 94 to the top nut 86 upwardly from an axis parallel to the vertical axis 78, and preferably 33°±2°. The angle $\gamma_2$, generally the A and D strings, or the strings 20 secured to the tuners 94 farthest from the top nut 86 (compare FIGS. 1 and 3) is between 12° and 20° as measured from the tuner 94 to the top nut 86 upwardly from an axis parallel to the vertical axis 78, and preferably 15°±2°. Alternatively, angle γ2, generally the A and D strings, or the strings 20 secured to the tuners 94 farthest from the top nut 86 is between 18° and 25° as measured from the tuner 94 to the top nut 86 upwardly from an axis parallel to the vertical axis 78, and preferably 21°±2° This angular structure improved sound and decreased the tendency to produce unwanted tones with only a slight increase in string tension, still keeping the strings 20 within normal tension parameters.

The original purpose of the neck central bore 98 was to accommodate and a carbon fiber rod insert which increased violin stability; however, the insert causes a large increase in weight that is suboptimal. By removing the rod and changing the printing characteristics to be stronger and more durable, the neck central bore 98 can be modified to act as a resonance bore, which are known in violins produced from other materials. A cross-section of the central bore 98 has a circular shape having a diameter no less than 3 mm no greater than 10 mm. In one specific embodiment, the diameter of the central bore 98 is currently 4.0 mm.

The tuner box 94 has a tuner bed 102 having four apertures therein through which the tuners 94 extend to engage the strings 20. The tuner bed 102 is generally a block member having a rectangular cross-section both transverse and parallel to the vertical axis. The tuner bed 102 has a thickness sufficient to provide resistance strength against the tension of the strings 20. The minimum and maximum thicknesses of the tuner bed 102 are dictated by the specific tuners employed. The thickness typically will fall within a range of 12 mm to 20 mm, preferably between 12 mm to 15 mm, and more preferably about 15 mm in the embodiment illustrated in FIG. 13.

In a prior art violin produced using additive manufacturing, the tuner bed 102 thickness was at the maximum that standard tuners 94 could accommodate, and due to inconsistencies with manufacturing, some tuners 94 would be unable to be accommodated. In one embodiment of the invention, the tuner box 94 thickness is reduced by removing material from a bottom surface of the tuner bed 102 so as not to affect the tension and distance ratios on a top surface of the tuner bed 102. This allows a wider variety of tuners 94 to be used, and there reduces tuner rejections caused by manufacturing inconsistencies.

In additive manufacturing, supports 106 are necessary to support the printing article, In a known prior violin produced via additive manufacturing, the design of the supports 106 were very thin and caused an instability when printed on non-Cartesian machines or machines with a moving build plate. The supports 106 are located adjacent and outwardly of the center bout 30 on opposite sides of the instrument body.

In an embodiment of the invention, a violin 10 produced via additive manufacturing is produced with supports with an increased lower support wall thickness which cradles the bottom of the chamber forming a bottom cradle 110, the stability was increased and the tipping risk on printing was dramatically reduced with no decreased in other quality features.

Figure 24:
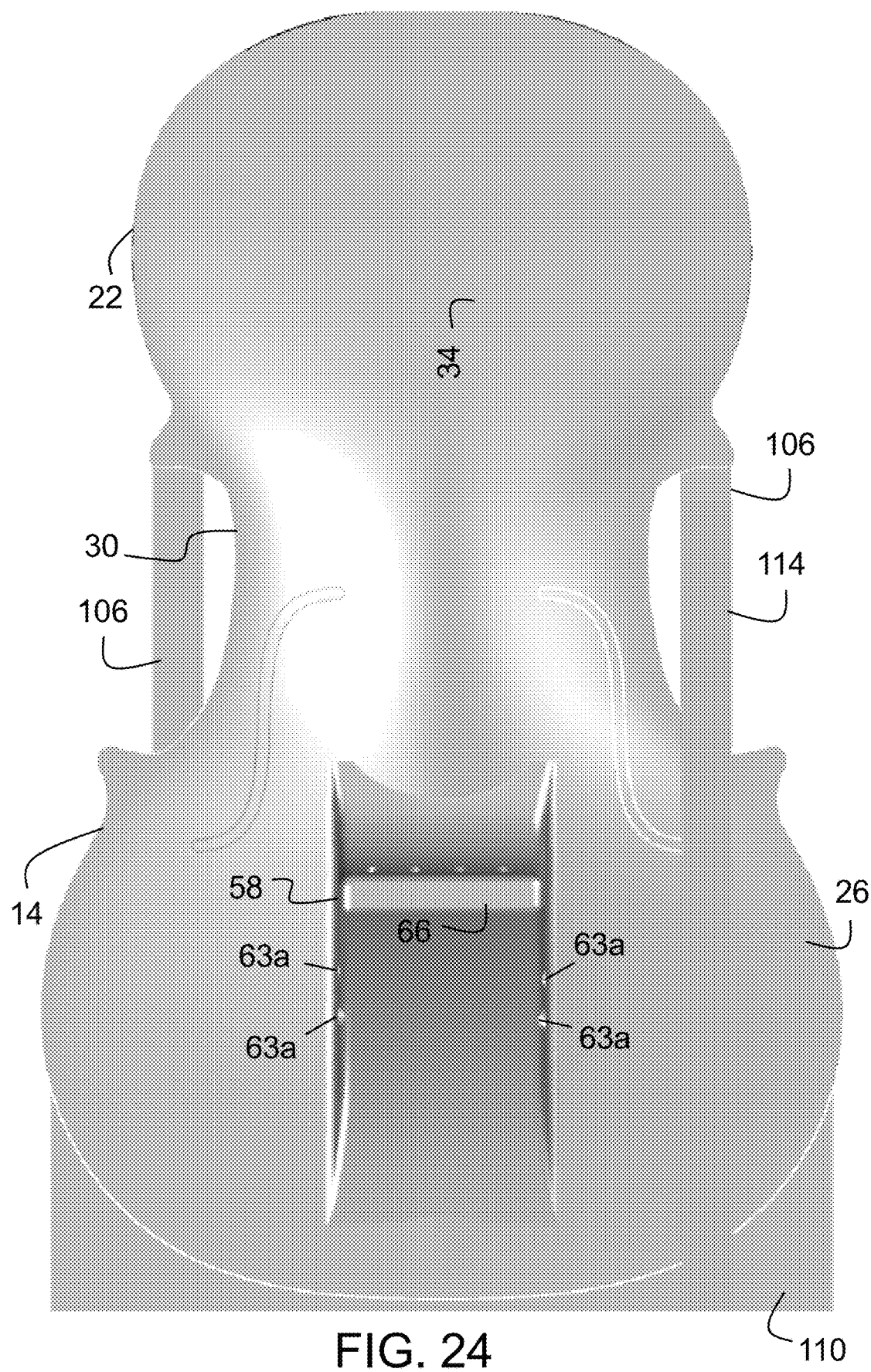
FIG. 24 is a front view of a stringed instrument body supported with supports formed during 3D printing.
Figure 25:
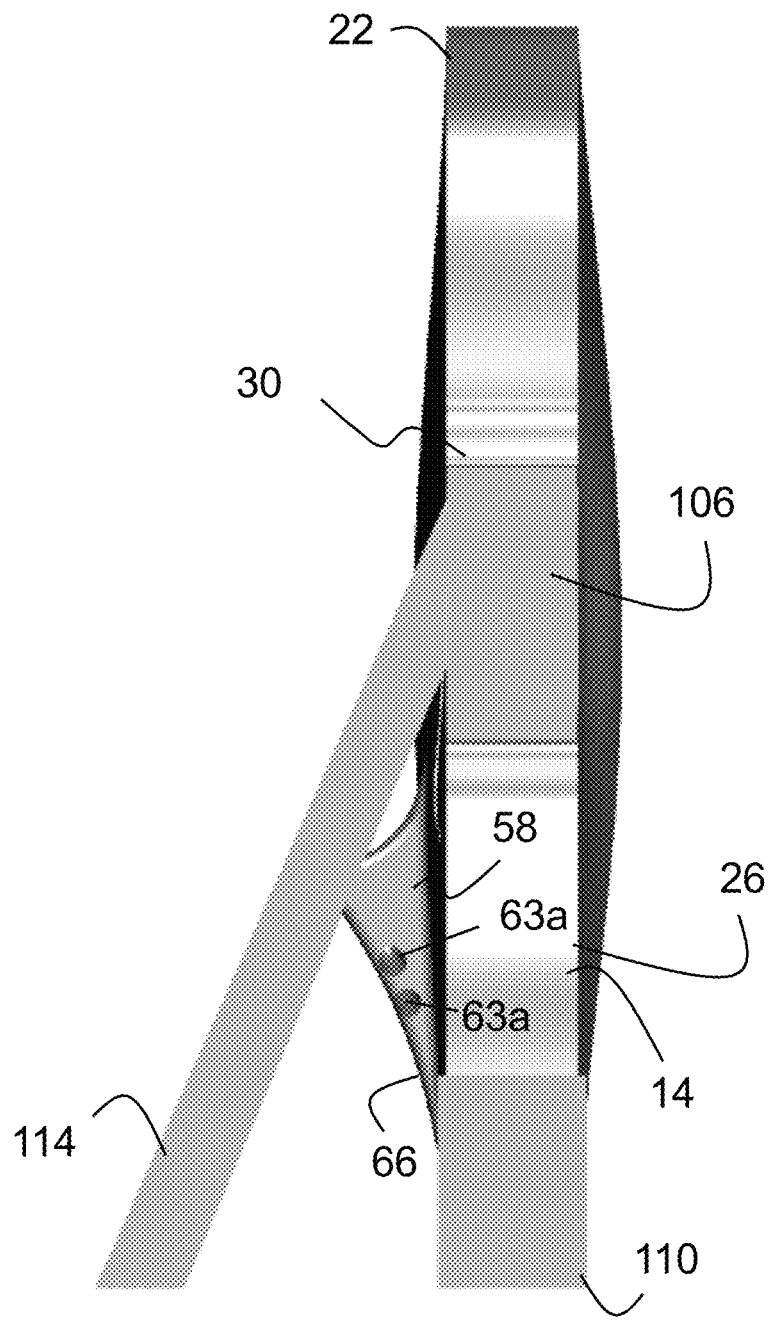
FIG. 25 is a side view of a stringed instrument body supported with supports formed during 3D printing.
Figure 26:
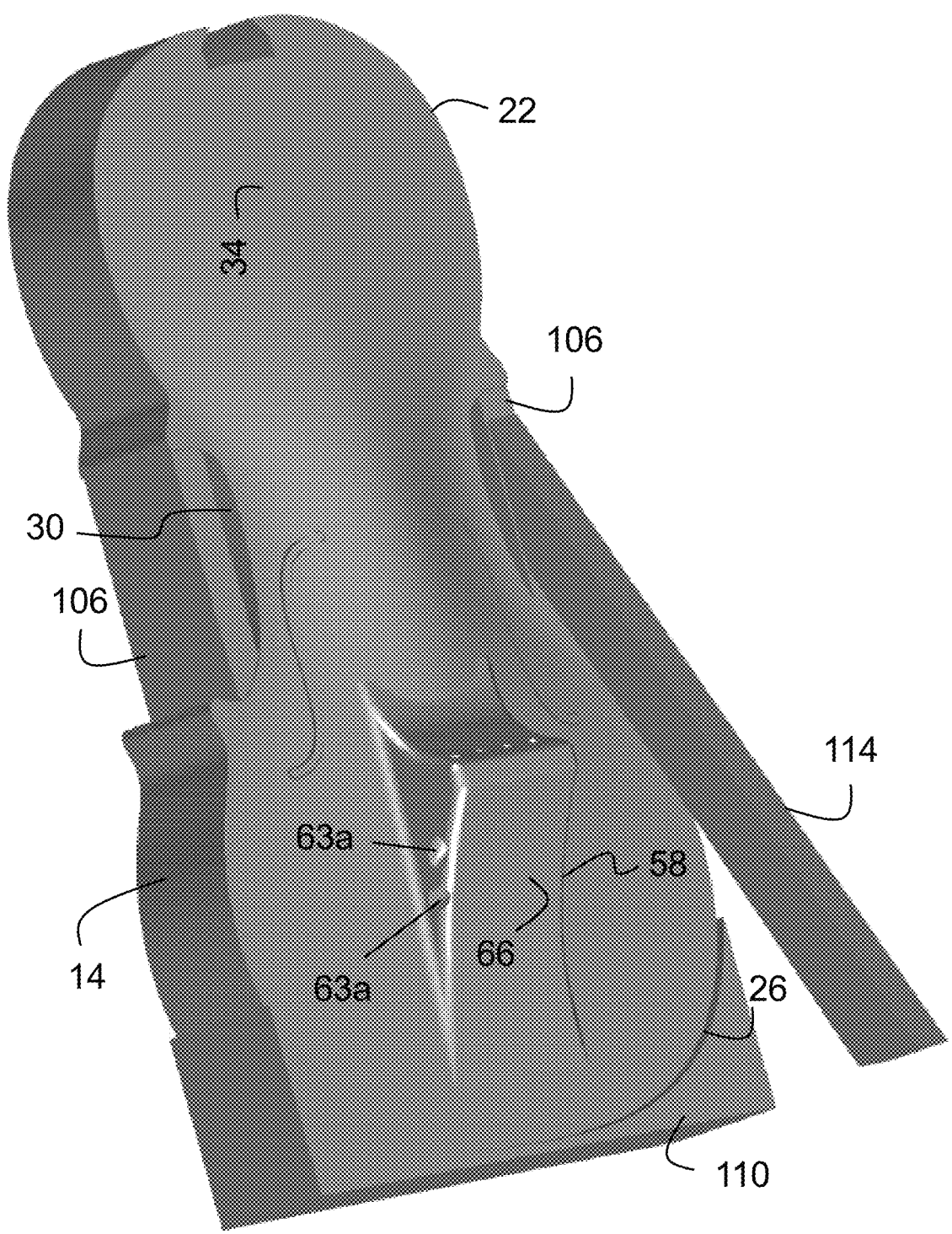
FIG. 26 is an elevational view of a stringed instrument body with supports formed during 3D printing.

As illustrated in FIGS. 24-26, one or more angled supports 114 may be introduced to provide further support and prevent tipping during additive manufacturing. These supports 114 may be integral with one or more of the center bout supports 106 and the bottom cradle 110, preferably one or both of the center bout supports 106.

While the specific embodiments have been illustrated and described, numerous modifications come to mind without significantly departing from the spirit of the invention, and the scope of protection is only limited by the scope of the accompanying Claims.

What is claimed is:

1. A string instrument comprising:
   a body comprising a top plate joined to a bottom plate forming an interior volume therebetween;
   a neck attached to the body and extending outwardly therefrom;
   a tailpiece joined to the body, the tailpiece comprising a plurality of tubular string bores, each string bore having an entrance for receiving a string therein and an exit from which the string emerges and extends to the neck, at least one of the plurality of exits formed by an aperture on a surface of the tailpiece wherein the aperture has a cross-sectional shape in which a length of a major axis of the cross-sectional shape is greater than a length of a minor axis of the cross-sectional shape,
   wherein the tailpiece comprises a shell wall defining a volume between the shell wall and the top plate, the shell wall having opposing sidewalls and a front face, wherein at least two string bore entrances are located on a first sidewall and at least two string bore entrances are located on an opposing second side wall, and wherein at least four string bore exits are located on the front face.

2. The string instrument of claim 1 comprising at least three string bores wherein each string bore exits is separated from an adjacent string bore exit by a space wherein a length each space is equal to a length of an adjacent space.

3. The string instrument of claim 1 wherein each string bore has a throat defined by a decreasing cross-sectional area of the string bore, each throat having an entry end and an exit end wherein each entry end is positioned at a height equal to a height of an entry end of an adjacent string bore.

4. The string instrument of claim 1 further comprising a bridge extending upwardly from the top plate between the neck and the tailpiece and over which each string in a plurality of strings is tensioned wherein the neck has a top nut on an end opposite an opposing end attached to the body, wherein a plurality of strings engage the top nut and extend down a length of the neck towards the tailpiece, the top nut having a plurality of grooves, each groove configured to receive a string in the plurality of strings and position the string at a height above a fingerboard surface of the neck, wherein the height of the string satisfies an equation where:

$$H_{TN} = \frac{D_{string}}{2} + \Delta H_{TN \to B} + K$$

where $H_{TN}$ is a height of the top nut above the fingerboard, $D_{string}$ is a string diameter, $\Delta H_{TN \to B}$ is a minimum height of the top nut above the bridge, and K is a correction factor between −0.5 mm to 0.5 mm.

5. The string instrument of claim 1 wherein the neck has a central bore extending from a free end towards the body, the central bore configured to achieve a desired resonance, wherein the central bore has a circular cross-sectional shape having a diameter no less than 3 mm and no greater than 10 mm.

6. The string instrument of claim 1 wherein the aperture forming the at least one of the plurality of exits has an oval cross-sectional shape.

7. The string instrument of claim 1 further comprising a tuner box joined to the neck opposite the body, the tuner box having a tuner bed having a plurality of apertures formed therein through which a corresponding plurality of tuners extend, the tuner bed having a thickness through which the apertures extend, the thickness within a range of 12 mm to 20 mm.

8. The string instrument of claim 1 wherein the at least four string bore exits are arranged in a straight line across the front face of the tailpiece.

9. The string instrument of claim 1 wherein the body and the tailpiece are of a single body construction, wherein the body and the tailpiece are integrally formed from a single piece of material.

10. The string instrument of claim 1 wherein the body comprises a soundpost within the interior volume, the soundpost joining the top plate and the bottom plate and integrally formed therewith.

11. The string instrument of claim 1 wherein the body and the neck are produced via additive manufacturing.

12. The string instrument of claim 1 wherein the string instrument is a violin.

13. The string instrument of claim 1 wherein the neck and the body are produced from a polymeric material.

14. The string instrument of claim 1 wherein the neck and the body are produced from a polylactic acid.

15. The string instrument of claim 1 wherein the neck and the body are produced from the group consisting of acrylonitrile butadiene styrene, derivatives of acrylonitrile butadiene styrene, and polycarbonate.

* * * * *